(12) United States Patent
Garvey, III et al.

(10) Patent No.: US 8,902,302 B2
(45) Date of Patent: Dec. 2, 2014

(54) METHOD AND APPARATUS FOR SURVEYING WITH A FEATURE LOCATION

(75) Inventors: Raymond E. Garvey, III, Loudon, TN (US); Jay P. Gatz, Avon Lake, OH (US); Paul W. Gress, Bay Village, OH (US)

(73) Assignee: Emerson Electric Co., St. Louis, MO (US)

( * ) Notice: Subject to any disclaimer, the term of this patent is extended or adjusted under 35 U.S.C. 154(b) by 532 days.

(21) Appl. No.: 13/234,982

(22) Filed: Sep. 16, 2011

(65) Prior Publication Data

US 2013/0070068 A1 Mar. 21, 2013

(51) Int. Cl.
*H04N 7/18* (2006.01)
*G01C 15/00* (2006.01)
*G01V 3/16* (2006.01)

(52) U.S. Cl.
CPC ..................................... *G01C 15/00* (2013.01)
USPC ............................................ 348/61; 324/330

(58) Field of Classification Search
CPC ........................................................ G01C 15/00
USPC .......... 348/61, 164, 333.1; 250/330; 324/326, 324/330
See application file for complete search history.

(56) References Cited

U.S. PATENT DOCUMENTS

| | | |
|---|---|---|
| 696,788 A | 4/1902 | Allen |
| 5,386,117 A | 1/1995 | Piety et al. |
| 5,637,871 A | 6/1997 | Piety et al. |
| 5,696,420 A | 12/1997 | Inanaga et al. |
| 6,078,874 A | 6/2000 | Piety et al. |
| 6,433,780 B1 | 8/2002 | Gordon et al. |
| 6,549,869 B1 | 4/2003 | Piety et al. |
| 6,798,379 B2 | 9/2004 | Tucker et al. |
| 7,402,803 B1 | 7/2008 | Wagner et al. |
| 7,443,154 B1 | 10/2008 | Merewether et al. |
| 7,454,050 B2 | 11/2008 | Garvey |
| 7,482,973 B2 | 1/2009 | Tucker et al. |
| 7,528,372 B2 | 5/2009 | Garvey, III et al. |
| 7,538,326 B2 | 5/2009 | Johnson et al. |
| 7,561,200 B2 | 7/2009 | Garvey, III et al. |
| 7,733,077 B1 | 6/2010 | Merewether et al. |
| 7,755,360 B1 | 7/2010 | Martin |
| 7,968,845 B1 | 6/2011 | Wagner |
| 2004/0172264 A1* | 9/2004 | Fletcher et al. ................... 705/1 |
| 2007/0027591 A1* | 2/2007 | Goldenberg et al. ........... 701/23 |
| 2007/0219722 A1 | 9/2007 | Sawyer, Jr. et al. |
| 2008/0088906 A1 | 4/2008 | Wagner et al. |
| 2008/0099683 A1 | 5/2008 | Schmidt et al. |

(Continued)

OTHER PUBLICATIONS

"Rigid® LT1000, SeeSnake® LT1000, Laptop Interface System" Datasheet © Apr. 2010; Catalog Sheet No. R-10-A; 999-997-853.10; Effective Date Feb. 25, 2010; pp. 1-2.

(Continued)

*Primary Examiner* — Behrooz Senfi
(74) *Attorney, Agent, or Firm* — Luedeka Neely Group, P.C.

(57) ABSTRACT

Methods are provided for conducting surveys of regions of interest, points of interest, and objects of interest. The methods typically involve using a survey instrument with programmed logic. The programmed logic may include one or more base of knowledge in an electronically accessible format, and may include statistical analysis software. The survey instrument generally includes a display and one or more sensors. The sensors may include a visible image or an infrared image sensor. The program logic may be used to guide an operator through a survey.

7 Claims, 15 Drawing Sheets

(56) References Cited

U.S. PATENT DOCUMENTS

| | | | |
|---|---|---|---|
| 2008/0125942 A1 | 5/2008 | Tucker et al. | |
| 2009/0121933 A1 | 5/2009 | Tucker et al. | |
| 2009/0168153 A1 | 7/2009 | Hiraiwa et al. | |
| 2009/0237263 A1 | 9/2009 | Sawyer, Jr. et al. | |
| 2010/0040109 A1 | 2/2010 | Schreher et al. | |
| 2010/0127922 A1 | 5/2010 | Sooy | |
| 2010/0318298 A1* | 12/2010 | Golparian et al. | 702/14 |
| 2011/0238303 A1* | 9/2011 | Scherzinger | 701/207 |
| 2013/0174072 A9* | 7/2013 | Nielsen et al. | 715/771 |

OTHER PUBLICATIONS

"RedShift OpTIC RS1080T" Datasheet, www.redshiftsystems.com, © 2008; pp. 1-2.

"Trimble® Scanning for Surveyors" by T. Lemmon and P. Biddiscombe, Trimble Survey, Westminster Colorado, www.trimble.com © 2005; pp. 1-9.

"Indoor Localization Algorithms for a Human-Operated Backpack System" by George Chen, et. al., downloaded from http://www-video.eecs.berkeley.edu/papers/gchen/gchen_3dpvt2010.pdf Mar. 26, 2010; pp. 1-8.

"Image capture and processing challenges—and solutions—in portable designs—Part III" by George Chen, et. al. downladed from http://www-video.eecs.berkeley.edu/papers/gchen/gchen_3dpvt2010.pdf on Mar. 3, 2010; pp. 1-2.

"Image Processing Technology for Rear View Camera (1): Development of Lane Detection System" by Arata Takahashi, et. al., a Research Report, R&D Review of Toyota, CRDL, vol. 38, No. 2, pp. 31-36, May 15, 2003.

"Fresnel Lenses, Positive Focal Length Fresnel Lens Used in a Variety of Sizes & Focal Lenghts" No. 030930 by Fresnel Technologies Inc., Fort Worth Texas © 2003.

"NaviTrack® II Operator's Manual", No. 999-998-160.10 Rev. B, by Rigid®, Ridge Tool Company, Elyria, OH, Printed Apr. 2006.

"The theory of buried pipe and cable location" by Radiodetection an SPX Company, Publication 90/010/ENG/6, © 2008.

"RIDGIDConnect" Datasheet by Rigid®, www.rigid.com, Catalog Sheet No. R-4-G, Apr. 2010.

"SeekTech® SR-60, Pipe, Cable and Sonde Locator, Operator's Manual", part No. 748-028-601-0A Rev. A, by Ridge Tool Company, Elyria, OH, Jan. 21, 2008.

"ScoutTM Sonde and Line Locator, Operator's Manual", part No. 999-998-989.10 Rev. B, by Ridge Tool Company, Elyria, OH, May, 2005.

NaviTrackTM Sonde and Line Locator, Operator's Manual, part No. 999-998-994.10, by Ridge Tool Company, Elyria, OH, Sep 2004.

"Sensors Unlimited Now Shipping Dual Wavelength Visible / Near-IR Camera in OEM Quantities" by Sensors Unlimited, Inc., Princeton, NJ, www.sensorsinc.com, Nov. 17, 2004.

"RedShift OpTIC RS1080X" Datasheet, www.redshiftsystems.com, © 2008.

"Visible/Near-IR vs. Uncooled Long Wave Infrared Automatic Target Recognition" by Bruce J. Schachter, Northrop Grumman ATR Dept, Baltimore, MD, Mar. 22, 2002.

"GPS Based Utility Surveying and Inventory" by Spectrum eXternal Line Inspection, Technologies Inc., © 2008.

* cited by examiner

METHOD AND APPARATUS FOR SURVEYING WITH A FEATURE LOCATION

FIELD

This disclosure relates to inspection and surveillance of an area. More particularly, this disclosure relates to methods and systems for field inspections using a handheld sensing apparatus to locate faults or other characteristic features.

BACKGROUND

Various construction, demolition, operation, maintenance, preventive maintenance, and predictive maintenance practices require the inspection of equipment, facilities, and surface and sub-surface features of land. Often these inspections are conducted by an operator using a hand-held, or at least portable, inspection instrument. The purposes of such inspections generally include location if an item of interest and assessment of the operational status of the item. Frequently it is difficult to locate the item, difficult to ensure that the correct item is located, and difficult to collect data that are necessary and sufficient to accurately and completely assess the status of the item. What are needed therefore are improved systems for conducting field surveys.

SUMMARY

The present disclosure provides a method of conducting a particular survey of a region of interest with a programmable survey instrument. The method typically includes a step of selecting a plurality of electronic data element requirements for data collection by an operator during the particular survey, and electronically monitoring a plurality of preliminary data element records acquired by the operator using the programmable survey instrument. The method generally involves electronically comparing the plurality of preliminary data element records with the plurality of electronic data element requirements and identifying at least one missing data element record compared with the plurality of electronic data element requirements for that survey. The method may also involve a step of electronically referring to an electronic base of knowledge and deriving at least one instruction for the operator regarding how to acquire the at least one missing data element requirement using the programmable survey instrument. The method may further include electronically monitoring at least one preliminary additional data element record acquired by the operator using the programmable survey instrument and electronically comparing the at least one preliminary additional data element record with the at least one missing data element requirement. The method may also involve electronically advising the operator when a combination of the preliminary data element records and the at least one preliminary additional data element record conforms to the data element requirements.

Also provided is a method for an operator to conduct a survey using a programmed survey instrument where the method includes generating a transducer signal in the survey instrument and electronically comparing the transducer signal with a base of knowledge to identify an object of interest. The method generally also includes a step of using programmed logic to prompt the operator for an interpretation by the operator of an accuracy of the identification of the object of interest, and using programmed logic to record an operator interpreted finding regarding object of interest, and reporting the recorded finding.

A further method of collecting information regarding a scene depicted on a display of a survey instrument includes a step of defining a point of interest in a scene on the display, and collecting sensory data from the scene such that a larger quantity of data are collected proximal to the point of interest and a smaller quantity of data are collected distal from the point of interest.

Also provided is a method for conducting a survey to locate a point of interest or to locate an object of interest using a programmed survey instrument having programmed logic, the method. The method generally involves using at least one sensory transducer to produce at least one sensory signal response, and using the programmed logic to access at least one base of knowledge and to access the at least one sensory signal response, and to access relational information. The method may further include processing the at least one sensory signal response to produce sensory characteristic information derived from at least a portion of the at least one sensory signal response, and then using programmed logic to operate on the sensory characteristic information and to operate on at least one programmed base of knowledge to recommend to an operator at least one suggested finding. The method may further include using the programmed logic to operate on the relational information to tag a record of a finding with associated relational information, and using the programmed logic to graphically display a geometric or cartographic representation of the proximity showing the at least one suggested finding to assist the operator in locating the point of interest or the item of interest.

Further provided is a method for conducting a survey to locate a point of interest or to locate an object of interest using a programmed survey instrument having programmed logic. Here the method involves using at least one sensory transducer to produce at least one sensory signal response and then using the programmed logic to processing the at least one sensory signal response to produce sensory characteristic information derived from at least a portion of the at least one sensory signal response. The method generally continues with using the programmed logic to perform a mathematical statistical control analysis or a statistical distribution analysis of the sensory characteristic information and then using the programmed logic to compare the mathematical statistical control analysis or statistical distribution analysis with an expected result and prompting the operator if the comparison suggests a false positive or a false negative indication.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of methods and devices for conducting inspection surveys. It is to be understood that other embodiments may be utilized, and that structural changes may be made and processes may vary in other embodiments.

Various embodiments of the present disclosure incorporate advancements organized below under the following categories: a survey instrument, position tracking with at survey instrument, locating with a survey instrument, imaging with a survey instrument, optical zoom in a survey instrument imaging system, coaxial zoom in a survey instrument imaging system, inspection with a survey instrument, analysis with a survey instrument, reporting from an operator with survey instrument to a customer, records worth keeping, and several diagrammatic survey illustrations.

Survey Instrument.

A preferred embodiment of the present disclosure comprises a handheld survey instrument to inspect the vicinity of an area.

Figure 1:
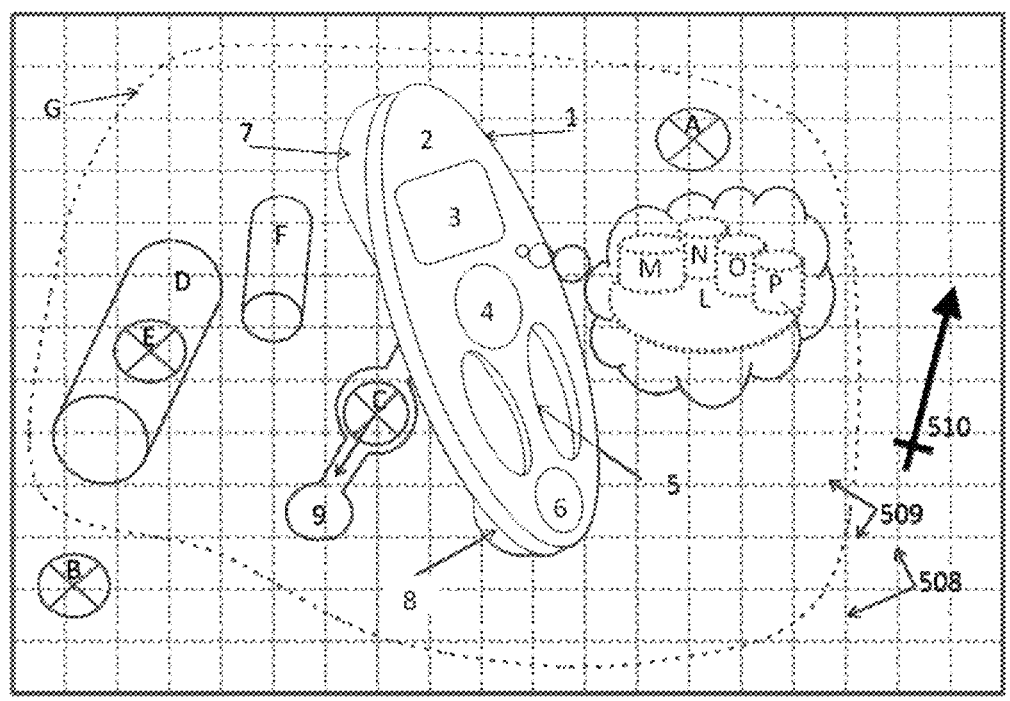
FIG. 1 is a somewhat schematic depiction of a handheld survey instrument such as a locator.

For example FIG. 1 diagram represents an isometric outline of handheld survey instrument 1 such as a locator used to survey a vicinity of an area G to locate an object of interest D within the area, and potentially find a point of interest E associated with the object of interest D. An aspect of the present disclosure is to equip an operator using as survey instrument 1 to correctly identify the object interest D and not mistakenly identify another object not of interest F as being the object of interest D. If both objects D and F can be detected using the survey instrument, then programmed logic uses knowledge base information and to guide an operator distinguishing between them. Ideally the programmed logic using knowledge base information helps the operator identify which one is the object of interest. Examples of objects of interest are such items as a metal part or a machine or other equipment, a material or an absence of a material, a component, an underground pipe or cable, or a building component such as in-wall or above ceiling or below floor or below roof building component. Typically the survey instrument 1 is "programmable," meaning that it is equipped with software that is programmed to instruct the operator regarding various aspects of conducting a survey. In certain applications the survey instrument 1 is potentially used to measure or otherwise characterize or find certain anomalies.

FIG. 1 depicts the following items: survey instrument 1, housing 2, display 3, keypad 4, handle 5, speaker 6, expanded housing 7, expanded housing 8, extended housing 9, reference point A, reference point B, tracking point C, object of interest D, point of interest E, object not of interest F, boundary for an area of interest G, programmed logic module L, programmed bases of knowledge M, N, O, and P, frame of reference 507, coordinate system 508 and 509, and reference azimuth 510.

An aspect of preferred embodiments of the present disclosure involves a programmable processor circuit having memory with programmed logic L operating on one of more programmed bases of knowledge. For example M, N, O, and P may correspond to a base of knowledge M having to do with fit, form, function, configuration, operation, and technical specification, for an instrument with sensors, accessories, and options; base of knowledge N having to do with application of a survey instrument in its uses during a particular survey or a particular instrument type under a particular set of conditions; a base of knowledge O having to do with an area to be inspected during a survey including at least boundary information such as coordinate information and reference point information; a base of knowledge P having to do with position tracking information such as map information or reference point information.

In some embodiments a base of knowledge may include one or more data bases that may be accessed electronically.

As used herein the term "particular survey" refers to a survey having a defined set of data element requirements for which data collection by an operator is desired. Such data element requirements generally dictate that certain specific survey instruments be employed. It is important to ensure that when a survey is conducted data element records are collected by an operator for every data element requirement. Typically, the survey instrument is programmed with a list of data element requirements, and is programmed to electronically compare the data element records collected by the operator with the data element requirements. If any data corresponding to any data element requirement is missing, then the instrument is typically programmed to prompt the operator to collect the missing data. Often, the survey instrument is programmed to electronically refer to an electronic base of knowledge to derive an instruction for the operator regarding how to acquire data corresponding to the missing data element requirement. For example, if the location of a particular underground pipeline is missing, an instruction may be derived by the survey instrument software using a base of knowledge of boundary information to direct the operator to "Search the eastern right-of-way on Highway 58 between Fairfax Street and Gibraltar Street."

A particular survey is typically conducted at a region of interest. A "region of interest" is a specific geographic location. A specific geographic location may be may be a large area such as "Watts Bar Lake," or it may be a smaller area such as "Parcel 34A, Lot B," or it may be a smaller yet area such as "Room 36 of Building 749." A specific location may be an even smaller space, such as "video card Serial Number 22436841," or it may be a microscopic space such as "yellow cells in pathology slide N-45231." A "reference location" in a region of interest may be identified by such procedures as indicating a position of a cursor on a display of a scene or by identifying a physical location within a region of interest. So for example, the survey instrument software may position a cursor on a display of a scene in order to direct an operator's attention to a reference location in a region of interest. A reference location in a region of interest may be compared with a missing data element in order to derive an instruction for the operator. For example, if a data element requirement is a temperature of a transformer and that data element is missing, an instruction may be derived by the survey instrument software using a base of knowledge of transformer locations to direct the operator to "Proceed to electrical pole 437 and measure the temperature of the transformer on that pole."

Bases of knowledge may be physically located in memory on the survey instrument or may be in memory on another field device or may be located in memory on a wireless or wired network accessible client or server. The following are examples of several bases of knowledge M, N, O, and P on which the programmed logic L may operate:

A first example base of knowledge is a locator base wherein the base includes knowledge to use a survey instrument to locate or identify objects of interest, and sometimes to locate or identify objects not of interest, in order to guide the surveyor. This base of knowledge typically includes information describing survey instrument sensor signal characteristics and other operator detectable or observable characteristics (a) corresponding to an object of interest, (b) corresponding to an object not of interest, (c) corresponding to interferences, and (d) corresponding to other aspects particularly for difficult locates.

A second example base of knowledge is a checklist base wherein the base includes knowledge to compile a checklist to guide the surveyor. This base of knowledge typically includes information describing best or accepted practice steps or actions or sequences in which to one may reasonable conduct a particular inspection or other survey using one or another survey instrument. It also includes information about things that should not be done or may be skipped during a best or accepted practice survey, inspection, or search to locate operation.

A third example base of knowledge is a map base wherein the base includes knowledge to prepare a map to guide the surveyor. This base of knowledge typically includes relational information associated with coordinate systems, frames of reference, azimuths and other geometric relationships between items, spatial proximities, distances, elevations, and the like. Many kinds of information are typically spatially related such that programmed logic L can interpret and send graphical user interface instructions to a graphical display 3 and thereby provided the user with a visual indication of that kind of information proximate to one or more other items represented on the display 3. Items may be represented in proportionate or disproportionate arrangement depending on preferences and limitations.

A fourth example base of knowledge is an operator instructions base wherein the base includes knowledge to prepare step-by-step instructions to guide the surveyor. This base of knowledge typically includes computerized maintenance management (CMMS) or other preventive maintenance (PM) or predictive maintenance (PdM) procedures for conduct of a survey or inspection or locate process following accepted practices.

Note that reference points A and B are shown in FIG. 1 to be inside and outside the area of interest G respectively, but both could be inside or outside the boundary of the area of interest G depending on a given situation. Note also that tracking point C is shown associated with the extended housing 9, but this could be associated or integrated or attached with the operator or with any portion of the housing 2, 7, 8, or 9.

The housing 2 is ergonomically designed for operator comfort and convenience while confining and protecting display 3, user keypad 4, speaker 5, internal circuits, computational processors, memory, position tracking apparatus, wireless transceiver and antenna, universal serial bus port, IrDA port, removable memory, camera, and sensing transducers. The housing 2 has expanded housing portions 7 and 8 and extended housing portion 9, each of which may be further divided into sub-compartments, is useful for containing one or power storage or power converting devices such as batteries or capacitors, communication devices, transmitters or receivers for signal communications.

It is envisioned that the wireless transceiver and antenna may be based upon a cellular communication infrastructure or an internet service provider or another radio or microwave or equivalent wireless communication system. Wireless communication such as Bluetooth or IrDA or equivalent may be used to provide signal linkage between detached portions of a survey instrument inspection system such as between a sensor and a housing or between a position tracking reference point and a position tracking electronic circuit associated with a survey instrument housing portion 2 or 7 or 8 or 9. The extended housing 9 is particularly useful for housing spatially separated transducers commonly used for locating underground utilities.

Surveying transducers are typically individual or combined, remote, non-contact, non-intrusive and non-destructive sensing detectors used to detect, locate, characterize, dimension, or otherwise measure an aspect of an object of interest D or a point of interest E are selected depending on sensor function and capabilities compared with surveying instrument design and surveying application requirements. It is common for the operator using a survey instrument with survey transducer to follow a predictable path such as a line or other pattern along an object of interest or in the vicinity of an object not of interest when the operator is attempting to locate or measure a point or points of interest expected to be associated with an object of interest or an object not of interest. Some examples for a survey transducer or for a suite of survey transducers to be used in a survey instrument to accomplish sensory detecting, distinguishing, and locating objects are the following: optical detector, visible imager, infrared imager, point radiometer, beta radiation detector, gamma radiation detector, x-ray radiation detector, other electromagnetic radiation detector, alpha radiation detector, passive ultrasound detector, pulse-echo ultrasound detector, audible sound detector, vibration detector, LYDAR or other laser or optical distance detector, laser profiler, 3D laser scanner for cloud mapping, gas analyzer, laser gas detector, flame ionization detector, thermal imaging gas detector, smoke detector, particle counter, eddy-current probe or other electromagnetic induction sensor, ferromagnetic induction sensor, time-resolved sensory measurement in presence of switching magnetic fields, relative permittivity sensor, capacitance sensor, x-ray fluorescence detector, fluoroscopic detector, Hall effect detector, flux coil, giant magneto resistance (GMR) detector, other magnetic field detector, surface acoustic wave detector, ground penetrating radar, orthogonal or rake antenna, ball marker with detector, voltage detector, or current clamp.

The surveying transducers selected for use in an instrument configuration for a particular survey are typically selected based on the intended uses of the survey instrument for detecting, locating, evaluating, and/or finding anomalies or faults associated with things of interest and for distinguishing these things from things not of interest and from background and from interferences and sensory noise. Detecting, locating, evaluating, finding faults or anomalies and distinguishing objects of interest is commonly accomplished using a combination of (a) sensory signal processing and presentation to an operator, together with (b) operator action and (c) operator interpretation. An object of interest typically has a substance and/or structure, but a point of interest may be a void that has no substance or structure. A void may be an anomalous aspect of a point of interest.

Sensory signal processing and presentation typically begins with transducer sensory signals which are responsive to physical, chemical, electrical, or magnetic properties or other characteristics of objects of interest, objects not of interest, background and anything else that is either real or perceived within a vicinity of the survey instrument transducer. Sensory signals perceived by the survey instrument serve to enhance, complement, and supplement an operator's human senses. A transducer, or a suite of transducers used with a survey instrument, is typically selected and adjusted for use in a particular survey instrument for particular kinds of surveys based on that sensor's or sensor suite's signal responses to one or more things in the following list: a reflected light characteristic, a metal characteristic, an oxide characteristic, a ferrous metal characteristic, a nonferrous metal characteristic, a density variation in solid or liquid matter, a void or gas in matter, a liquid in a solid substance, a solid in a liquid substance, particulates or inclusions in a liquid or gas or solid substance, a crystalline morphology or a variation of crystalline morphology in a substance, an amorphous morphology in a substance, a distinctive man-made geometric characteristic such as substantially linear or tubular or rectangular or circular or predictably symmetric edge shape, an A/C or a D/C magnetic field response, an A/C or a D/C electric field response, and induction response, a temperature characteristic, an emissivity characteristic, a relative permittivity characteristic, a capacitance characteristic, a paramagnetic characteristic, a particular dimension or proportion or aspect ratio characteristic, an atomic mass unit characteristic, a molecular weight characteristic, an electrical conductivity or resistance characteristic, an ionic mobility characteristic, a dielectric strength characteristic, a load response characteristic, an electromagnetic energy attenuation characteristic, a sonic or ultrasonic energy attenuation characteristic, an electromagnetic radiation characteristic, a beta radiation characteristic, a gamma radiation characteristic, an alpha radiation characteristic, a neutron radiation characteristic, an absorption cross section characteristic, energy dispersive x-ray or other x-ray radiation characteristic, an oxidation characteristic, an optical transmission characteristic, an optical emission characteristic, an optical reflection characteristic, an optical color characteristic, a fluorescence characteristic, a phosphorescence characteristic, a thermal expansion characteristic, a damping characteristic, a vibration characteristic, a resonance characteristic, or a combination of one or more of these. Those skilled in the art are able to detect, to measure, and when practical to isolate one substance or structure from another Sensory signal processing and presentation typically involves steps outlined in Table 1. The sensory signal processing steps are not in particular order. The steps typically include the following things: processing an analog signal from a sensor, if analog then converting the analog signal to a digital signal, enhancing signal information, discarding noise information, interpreting signal information, processing of interpreted signal information by programmed logic to assist operator in detecting items of interest and distinguishing items of interest from items not of interest and from background and from possibly false indications, determining a coordinate system or other location associated with a position of the indication, and displaying a map location of the object relative to other things within a survey operation.

TABLE 1

Activities listed for processing sensory signal information

| List no. | Activity (not in particular order) |
|---|---|
| 1 | Receiving information about an object of interest |
| 2 | Producing a sensor signal |
| 3 | Processing the sensor signal to produce sensor signal information |
| 4 | Enhancing sensor signal information |
| 5 | Discarding noise information |
| 6 | Using programmed logic to process sensor signal information and detect a possible indication of a possible object |
| 7 | Using programmed logic operating on a knowledge base to compare the possible indication of a possible object with information from the knowledge base |
| 8 | Using programmed logic operating on the possible indication and on the comparison results to assist an operator with detecting an object |
| 9 | Using programmed logic operating on the indication and on the comparison and the detection to assist an operator with distinguishing between an object of interest, an object not of interest, a background, and a false indication of an object |
| 10 | Using programmed logic operating on a detected object to associate a relative proximity for the object |
| 11 | Using programmed logic operating on the proximity for an object to instruct a display driver to display a graphical representation for the proximity |

Sensory signal processing is sometimes a passive, wherein a detector is receiving sensory signal information transmitted from objects. Some examples include airborne sound or ultrasound, black-body radiation, structural vibration, optical appearance, and electrostatic charge. Sensory signal processing is sometimes active, wherein a sending unit transmits energetic information that is reflected, bounced, absorbed and re-radiated, or in some other way is used to illuminate a presence or an absence of an object. Some examples include pulse-echo ultrasound, Doppler measurement, radar, sonar, LYDAR, impact resonant vibration and damping detection, ball-marker detection, fluorescence, phosphorescence, and energy dispersive x-ray.

Sensory signal processing may provide indications such as "yes" or "no" or "maybe" when a sensor detects an item; or it may provide a range of amplitudes or a range of frequencies or another distribution of signal range to convey a potentially meaningful characteristic such as range or size or angle or another graduated measurement aspect.

Sensory signal processing may be intended for programmed logical interpretation and possibly for audible or graphical presentation to a user in the form of a lone point or area measurement (such as a single pixel) or as an array of measurements (such as a line of pixels) or as a two dimensional array of measurements (such as a two dimensional focal plane array) or as a three dimensional array of measurements (such as a geometric volume spatial array) or as another meaningful presentation of measurand data.

Signal processing is typically accomplished with close association to a frame of reference and coordinate tracking system. It is important to process signals and tag a location at which items of interest, items not of interest, and other detections are found, and associating these things with the frame of reference and coordinate system. A handheld survey instrument is normally carried or otherwise transported by an operator; and measurement detection is performed, first at one survey instrument location, then at another, and another, and so on. As will be described in the following paragraph, an operator often uses a swinging motion or walking motion, or other movement while viewing sensor signal outputs in order to accomplish the survey and in order to locate objects. This way the operator senses objects of interest, objects not of interest, and background, as well as interferences and false indications, as positional locations are varied. The operator typically validates or rejects these finds as they come up during a survey using his or her human judgment and interpretations.

Operator Action.

Survey instruments assist an operator to detect, locate, and find anomalies or other faults. Survey instruments supplement an operator's visual sight, audible hearing, and touch perceptions by audibly indicating and graphically displaying meaningful things for interpretation by the operator. It is the operator's responsibility to transport the survey instrument within sensory range of detectable objects. Depending on sensors and measurement capabilities, it may be necessary for the operator to swing or otherwise move the sensor in one direction or another such that a locate can be accomplished.

Operator Interpretation.

The present disclosure divides interpretation between programmed logic and operator judgment to take advantage of core competencies and avoid significant limitations of the human and the programmed device. Humans are error prone, bored by highly repetitive tasks, relatively slow, and sometimes miss or overlook or misinterpret a detectible signature from as sensor signal. Programmed logic is limited in scope of its "interpretation" and bases of knowledge. Programmed logic is tireless, capable of relatively error-free repetitive analysis and relatively good speed and precision. Human judgment is ideal for understanding principles, comparing and contrasting information even in presence of too much data or conflicting data or missing data, identifying changing conditions, and assessing how and why these things may influence sensory measurement based on widely varying experiences.

As previously noted, it is important to ensure that when a survey is conducted data element records are collected for every data element requirement. In addition, when measurements are made with surveying instrument transducers, it is important to qualify acceptable data from unacceptable or out-of-bounds data. This generally involves programming the survey instrument with acceptance criteria for specific data element requirements, and then electronically monitoring preliminary data element records that are acquired by the operator using the survey instrument, and then electronically comparing the data element records with, the acceptance criteria for the data element requirements to determine if the acquired data records are acceptable. Out-of-bounds (i.e., unacceptable) data may, for example, be identified statistically such as by statistical process control (SPC) or by other statistical methods such as a sorted cumulative distribution of a measurand data population. Other ways to qualify acceptable measurements is by comparing against signal to noise level or against signal strength or to compare against tolerance bands or to compare against information derived from reference data. Still other methods for validating a meaningful measurement having sufficient resolution for applicable interpretation may be chosen as well. When data is out of bounds a surveying instrument may be programmed to appropriately prompt an operator. For example the surveying instrument may be used to manually or to automatically collect a different reading for comparison with or replacement of an out-of-bounds measurement.

Embodiments of the present disclosure combine visible and/or infrared imaging with other remote sensing technologies. Furthermore the application of coaxial zoom, which is advantageous for wide angle "big picture" association of items within a vicinity of an area G and for closer inspection of certain objects of interest D and points of interest E, is introduced and discussed later in this application.

Figure 9:
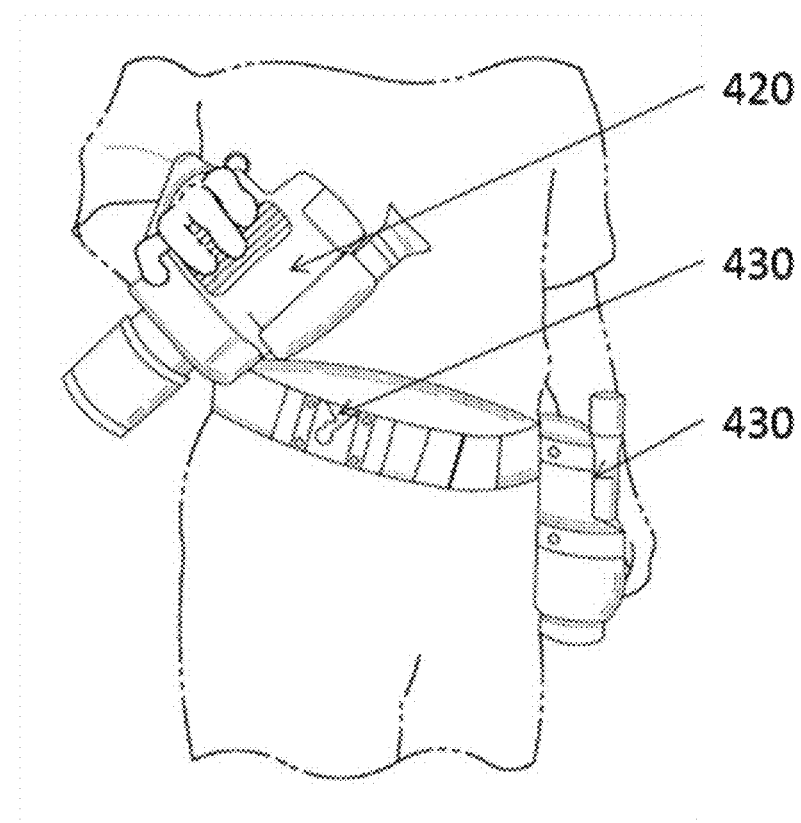
FIG. 9 illustrates an operator with a handheld survey instrument with accessories.

Some embodiment of the present disclosure involves assisting an operator performing an inspection of the vicinity of an area by use of a vest or pockets or other conveniences to protect items and secure them to a person while going to and from and performing a survey. An example is reflected in FIG. 9 showing a handheld survey instrument 420 carried along with device worn on a human body to facilitate freeing an operator to perform multiple functions in the field such, I this example it is a belt with accessory clips 430, and accessories 440 such as a wireless probe similar to that described in U.S. Pat. No. 6,078,874 or transmitters or receivers or markers or other devices or consumable items needed for a survey of a vicinity of an area. It is important to consider the conditions surrounding a survey inspection of a vicinity of an area most often require one individual walking more than one kilometer carrying many items to conduct a survey needed including batteries or another type of self-contained electrical power generating or converting or scavenging system sufficient to support the survey instrument and accessories.

Position Tracking with a Survey Instrument.

A housing portion contains the position tracking apparatus. That portion or an associated portion, such as the extended housing 9, further contains one or more transducers for making sensory contact with an object of interest D, and more specifically at a point of interest E on the object of interest D.

In addition to selecting a sensor type based on sensor function and capabilities, one must also decide how to best employ the sensor type. Some sensors are passive, which means they are capable of making sensory contact with an object or interest D or a point of interest E or a vicinity of an area G wherein there is not an interest by receiving signal information such as infrared or visible electromagnetic radiation, or audible or ultrasound sonic energy, or magnetic or electromagnetic flux fields, or the like without input stimulation in the system or the vicinity of an area G. On the other hand, some sensors (possibly even the same sensors as ones used for passive sensing) are very effectively used in active measurement conditions wherein an active stimulation is used to figuratively illuminate the object of interest D or point of interest E or a vicinity of an area G wherein there is not an interest. For example sondes or other markers or transmitters are often used to identify a point of obstruction E in a pipe D. For another example visible or infrared lighting is often used to with visible or infrared detectors. For yet another example alternating voltage and/or current may is sometimes used to stimulate perceivable electric or magnetic field signal information. For one more example, pulse-echo ultrasound signal is often used along with a coupling such as a fluid medium to perceive invisible surfaces and measure such things as a thickness, a depth, a diameter, a layer, a void, or a defect.

Tracking point C has to do with identifying a location of an operator and/or a survey instrument 1 or a part of a survey instrument such as an extended housing portion 9. This identifying a location is typically relative to a reference point A and/or reference point B and or other reference points either inside or outside an area of interest. For example a global positioning system (GPS) is useful for identifying a location outdoors within say 10 meters and with intermittent dependability due to interruptions or interferences commonly associated with GPS. For another example a range and azimuth from a known reference point (A, B, or other) or triangulation among multiple reference points are well known ways to locate a point in 2D or 3D spatial coordinates. Determining a range and or an azimuth from a known point of reference may be done various ways such as a physical wheel, an optical tracking system (analogous to an optical mouse), electro-mechanical gyroscope, vibration gyroscope, fixed point plus range detector, and fixed point(s) plus RF triangulation. One approach herein is to constantly determine ones position relative to one or more reference points. A similar but different approach is to track displacement by integrating velocity and/or double integrating acceleration. The latter approach may or may not retain association with fixed earth reference points like GPS or benchmarks or the like, and instead identify a location in more of a relative manner such as from a last static position, or from the time when a button was pushed by an operator.

Actively sensed position tracking determinations (as well as other measurements) may be facilitated by using an active signal generator such as an ultrasonic warbler or an electromagnetic signal generator or a laser ranging device or equivalent. An active signal generator may serve as reference points A or B, particularly when its signal can be interpreted to derive either a range or an azimuth direction or an elevation. In this case it is helpful to establish a benchmark location and spatial orientation for this active signal generator and record coordinate type information about this location for association with its uses.

In some embodiments an actively sensed reference point is self-powered and self-contained module, such as segment portion, of expanded housing 7 or 8, which an operator may detach from a survey instrument 1 and place at a desired reference point location point A or B or E to facilitate either a position tracking or a locate or a measurement or an image or a report record.

Locating with a Survey Instrument.

Locators such as those described in cited prior art references are capable of locating underground pipes and cables, and estimating depths and angles from the locator to the object of interest D or point of interest E. When speaking about locators, it is common to refer to a sensor indication showing an object of interest or a point of interest as a "locate".

In preferred embodiments of the present disclosure this location information is physically and dimensionally associated with identifying a location of an operator or survey instrument. This supports mapping, reporting, and analyzing discussed later in this application.

The diagrammatic representation of tracking point C includes an arrow representing plumb-line-orientation pointing downward along an axis such as that of an extended housing portion 9. This exemplary diagram conveys a sensor orientation that is perpendicular to a horizon, important for some measurements such as elevation and depth and locate-angle. Level sensing, azimuth sensing, range sensing, triangulation, and redundancy of overlapping locate and track measurements all combine for more effective measurement, analysis, and reporting according to embodiments of the present disclosure.

It is envisioned that some device resources may be shared between position tracking and locating systems associated with a survey instrument. For example a display 3 may be used for both functions, assisting the operator with identifying his or her location and with finding things within a vicinity of an area G and with designating where an area G may be found within a bigger picture view. For another example an azimuth indicating technology may be used to support both tracking a location and locating an object of interest D or a point of interest E. When device resources are shared between position tracking and locating systems, a switching circuit is used to manage power supplied and conserve battery life such that lower power is used when lower power is needed, high power is used when higher power is needed, and very low power is used when neither one is active.

Actively sensed locate determinations (as well as other measurements) may be facilitated by using an active signal generator such as an ultrasonic warbler or an electromagnetic signal generator or laser ranging device or equivalent. In certain applications it is important to associate spatial orientation and position with a survey instrument position tracking system or with reference points A or B.

Alternative embodiments of the present disclosure may employ split configurations, separating an associated arrangement that is diagrammatically shown in FIG. 1. For example display 3 may be functionally separated using from the housing of survey instrument 1 using wireless communications linkage. Furthermore a wireless network may be used to transmit data among and between memory lactations and thereby bases of knowledge M, N, O, and P may be off-board or on-board. This is also relevant for programmed logic L and other memory accessible information.

Several embodiments are capable of incorporating statistical techniques such as those disclosed in ASTM D7720-11 and in its cited references to assist a user with locating an anomalous condition or a substance or a structure. Statistical techniques are potentially advantageous compared with simpler techniques such as thermal image hot-spot detection for finding anomalous conditions detectible with excursions in temperature or emissivity. For example statistical techniques may help identify false negative results in field of data measurements similar to the manner in which they detect anomalous pixels. In effect such statistical techniques may also increase the likelihood of accurately detecting a true anomaly in a field of view because nearby pixels confirm a possible indication. For another example, the statistical techniques may assist an operator to (A) detect and/or (B) identify certain anomalies or substances or structures. For example this technique may be applicable for thermal images of hot spots in far away objects like power transmission and distribution lines or anomalous points found associated with an underground line. While statistical techniques may be used to find a faulty pixel compared to its neighbors a more helpful technique may be to look for an anomalous or a substance or a structure that may be detected first with one portion of a sensory device and later with a different location on or with a different device. Statistical techniques like these may prove that an event is actually present in the outside environment and not associated with a performance anomaly of a sensory transducer such as a focal plane array.

Imaging with a Survey Instrument.

Certain embodiments of the present disclosure integrated visible and/or infrared imaging locating, detecting, measuring, and position tracking using a survey instrument.

Focal plane array infrared imaging cameras are commonly used for surveillance and for inspections wherein variations in material temperature, emissivity, or absorptivity, may be interpreted to provide useful information. For example elevated temperature at or near the location of an electrical switch can be indicative of bad electrical contacts. For another example, variations in materials' infrared emissivity, absorptivity, and reflectivity characteristics can enhance day- or night-vision capability of thermal imaging cameras, allowing operators to better distinguish physical presence of certain solid, liquid or gaseous materials even when these materials are at similar temperature.

It has previously been mentioned that imaging technology may be used for identifying a moving location analogous to the way an optical mouse tracks a position where a shallow angle infrared light source is reflected off of a surface and then detected by a rapidly responsive infrared detector array supported by a digital signal processor capable of tracking changes in displacement and direction. That approach alone is insufficient for the present disclosure because of large spatial and physical irregularities. According to the present disclosure active infrared illumination is not preferred. Instead passive infrared or visible light radiation or both are used to track and meter either relative displacement and direction or speed and direction or acceleration and direction or a combination of all three.

Imaging of in-field markings such locates or findings applied to grounds or walls, and subsequent documenting and reporting of these images and associated data are important survey activities. Surveyors record their findings electronically, on paper, and on the surfaces of ground, asphalt, building, or other vicinity of an area being surveyed. Camera images provide a direct association between the physical markings at the survey vicinity with electronic and paper records. This removes doubt as to the completeness and exactness of a survey. By adding identifying location information alongside image identifying information it becomes highly unlikely that images will be mixed up or inadvertently misused.

While on a survey covering the vicinity of an area, visible and infrared imaging adds particular value by readily documenting things not expected to be found in the vicinity of the area G. Visible imaging using still or video format is capable of documenting either 100% inspection of an area survey including all normal conditions detected, or of documenting only a very small percentage of an area survey where exceptions, faults, or other anomalies were detected.

Infrared imaging offers advantages for effective application in all lighting situations and sometimes also provides advantage of identifying differences in emissivity or temperature or identifying absolute temperature. These things are often important distinguishing characteristics for locating, identifying, and measuring meaningful characteristics during a survey.

Visible imaging offers advantages of convenience, human familiarity and interpretation, and wide range of distinguishing capabilities among objects of similar temperature and emissivity.

Optical Zoom in Survey Instrument Imaging System.

It is common practice for field users of infrared imaging cameras to go to the field carrying a handheld un-cooled focal plane array infrared camera with a single infrared transmitting lens configuration, wherein the lens is capable of focusing infrared image information onto an infrared energy sensitive focal plane array, but wherein the lens configuration is not capable of zooming and thereby substantially changing the overall field of view (FOV) angle. Therefore this user is obliged to get physically closer to or farther away from the object of interest in order to establish a desired perspective using an FOV as projected through that infrared capable lens configuration onto the sensitive focal plane.

It is possible for operators with particular infrared imaging cameras to swap out lenses in the field so that a different magnification or FOV may be observed using a single infrared camera. The process of field swapping of lenses is time consuming and cumbersome, increases cost and complexity, and may require thermal image radiometric calibration corresponding to separately to each image arrangement.

The present disclosure advances the art for inspection and surveillance by addressing needs for simpler, more robust, and more affordable co-axial optical zoom to deliver relatively higher and lower magnifications through lens optics avoiding use of traditional mechanical zoom adjustments and thereby assisting a user with an inspection or surveillance application that calls for greater optical information nearby a point of interest.

Operator selection to identify what object of interest and what result a survey in the vicinity of an area is intend to find as results.

Device selects among the available sensing technologies those most likely to find the object of interest.

A device having a camera incorporates a zoom capability such as coaxial zoom to provide a wider field of view for association of objects in the vicinity of an area and narrower field of view for an object of interest D and a point of interest E.

Coaxial Zoom in a Survey Instrument Imaging System.

The following detailed description is exemplary in nature and is not intended to limit the scope, applicability or configuration of the disclosure in any way. Rather the following description provides practical illustrations for implementing exemplary embodiments of the present disclosure. In the foregoing detailed description, the disclosure has been described with reference to specific embodiments. However it may be appreciated that various modifications and changes can be made without departing from the scope of the disclosure as set forth in the appended claims.

One aspect of the present disclosure is a user selectable co-axial optical magnification made possible by lens optics which disproportionately project image information onto a sensitive focal plane detector. A software transformation is used to model and correct the resulting image distortion. According to this aspect of the disclosure proportions of a projected image are more highly magnified in vicinity of a central axis relative to portions of the projected image at an outer periphery away from the central axis.

Another aspect of the present disclosure is that a FOV angle may be adjusted from a relatively wider FOV angle having a relatively lower magnification to a relatively narrower FOV angle having a relatively higher magnification to effectively achieve co-axial optical zoom. This optical zoom magnification is a result of disproportionately projecting image information onto a sensitive focal plane such that a relatively smaller portion of the central image is projected onto a relatively larger portion of the sensitive focal plane area, and such that a relatively larger portion of the peripheral image is projected onto a relatively smaller portion of a sensitive focal plane area.

Preferred embodiments of the present disclosure use two discrete magnification selections such as wide and zoom, wherein each one produces a photographic image having relatively similar pixilated resolution. For example a wide angle FOV image selection is 1× magnification, and a narrow angle FOV zoom is 3× magnification. Alternate embodiments deliver a larger number of magnification selections or zoom choices in between these lower and upper magnifications.

Preferred embodiments of the present disclosure make use of lens optics to disproportionately project image information onto a uniformly and symmetrically proportioned sensitive focal plane detector. That is to say that across a pixilated focal plane the pixels are of approximately similar spatial arrangement. Such a manmade array is dissimilar from an eagle's retina wherein sensing rods are more closely spaced in one portion, thereby providing an effect of optical zoom in that portion of the retina. Alternative embodiments may employ disproportioned spatial sensitivity on a manmade detector more like that of an eagle's retina. This is an alternative from entirely depending on lens designs to achieve disproportionate image information.

Figure 2:
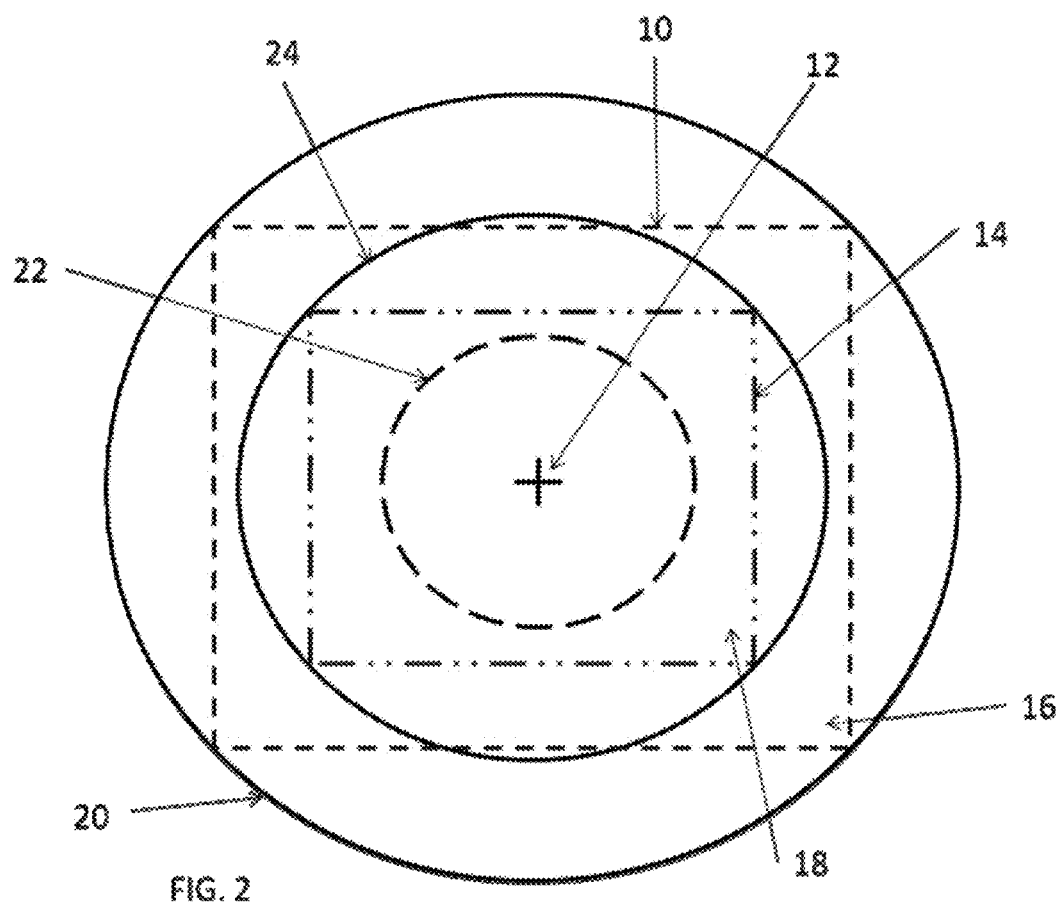
FIG. 2 is an axisymmetric projection of disproportioned image information on a focal plane.

A preferred embodiment uses a custom lens optics disproportionately project image information onto a sensitive focal plane. FIG. 2 diagram represents an axisymmetric projection of disproportioned image information on a sensitive focal plane detector including the following: detector 10, centerline 12 or center pixel 12, zoom image information region 14, corner 16, corner 18, circle 20, circle 22, and circle 24.

Lens centerline 12 and focal plane center pixel nearest centerline 12 on a pixilated detector 10 are coincident or at least proximate.

Wide angle FOV circle 20 approximately touches the four corners of the detector 10 and the centerline 12 from the lens passes very near the center of the detector 10.

Distorted central image information circle 22 represents a lens-magnified image area on detector 10. If the central image were not lens-magnified and instead that portion of the wide angle FOV circle 20 image were uniformly magnified with the same magnification as the periphery of wide angle FOV circle 20 then that central image would only cover a smaller area represented by the undistorted central image information circle 22.

According to this embodiment of the present disclosure the custom lens arrangement is used to disproportionately project image information represented between circle 22 and circle 20 such that image information continuity is projected in the area between circle 24 and circle 20. Image information continuity herein refers to negligible gaps or overlaps in distorted image information.

To further demonstrate this exemplary description using the diagram of FIG. 2, one might select a diameter of circle 24 that is two times the diameter of circle 22, and select a diameter of circle 20 that is three times the diameter of circle 22. These selections yield an area of circle 22 that is ~11% of the area of circle 20, the area of circle 24 that is ~44% of circle 20. Therefore in this example the central image area GOV is expanded from ~11% if this were a uniformly proportioned image to ~44% image area in this disproportioned image. That is an increase of ~400% area on the sensitive focal plane. Also in this example an image periphery, which is a remainder of the image outside of the central area, is confined to a correspondingly reduced area.

Disproportionate projection is demonstrated in this example wherein a circumference around the central image area is doubled from the circumference of circle 22 to the circumference of circle 24 and wherein a circumference around the entire image area GOV remains at circle 20.

Preferred embodiments use lens optics to produce disproportionately projected image information having continuously changing magnification wherein the image magnification is greatest in vicinity the centerline 12 and least in vicinity of peripheral boundary circle 20. Sensitive focal plane location of corner 16 is intended to diagrammatically represent a corner portion of the sensitive focal plane where image information is magnified least as one expects in vicinity of boundary circle 20. Dotted line of zoom image information region 14 diagrammatically represents a geometric periphery of an area on the sensitive focal plane from which magnified image information is collected. In practice a shape of this geometric periphery is not truly rectangular. Instead it is typically barrel shape or sail shape depending on lens optics and focal plane geometry, due image distortions caused by projecting the disproportionate central image information on sensitive focal plane detector 10 by a custom lens.

Alternate embodiments use lens optics to produce image magnification that is relatively constant from a centerline to a radial position in vicinity of circle 24 on sensitive focal plane detector 10. Still other alternate embodiments select lens optics wherein the image magnification is effectively stepped and wherein care is taken to minimize false information from concurrently overlapping or gapping image projections on the sensitive focal plane.

Preferred embodiments use axisymmetric lens optics to produce disproportionately projected image information.

Alternate embodiments use not-axisymmetric lens optics. One such alternate uses one or more lenses having two-axis bilateral symmetry as diagrammatically shown in FIG. 3 wherein elliptical foci 46 depict the two axes. FIG. 2 information is similar to FIG. 1 except for an elliptical shape which is applicable to an elongated focal plane geometry. FIG. 2 diagrams an elliptical projection of disproportioned image information on a sensitive focal plane including the following: sensitive focal plane 30, centerline 32, zoom image 34, corner 36, corner 38, ellipse 40, ellipse 42, ellipse 44, and elliptical foci 46.

Still other alternate embodiments use other geometries which are adequately modeled such that a disproportionate image can be projected and such that the model may be used to transform detected image information to a reasonable un-distorted representation.

Figure 3:
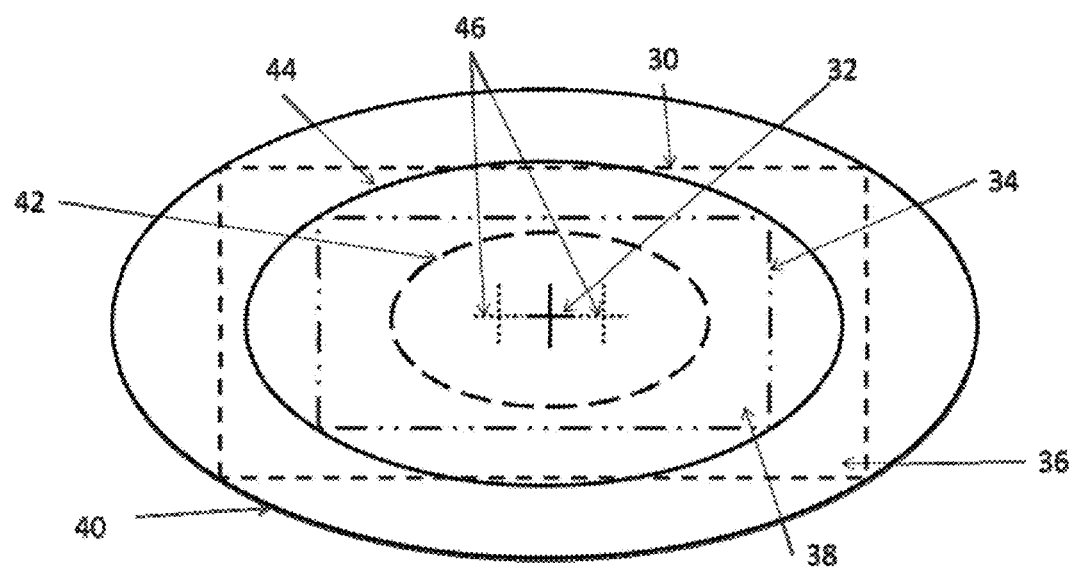
FIG. 3 is an elliptical projection of disproportioned image information on a focal plane.

FIG. 2 and FIG. 3 both represent the sensitive focal plane geometry as rectangular which is an often preferred geometry. An alternate geometry can be used such as pentagonal or hexagonal. Also, the sensitive focal plane itself may be flat, curved, or double-curved. These two aspects, outline geometry and focal plane flatness, are typically constrained by practices related to a particular detector manufacturing process.

Preferred embodiments of the present disclosure use an infrared imaging detector type selected by one skilled in the art from available types of detectors. There are many types of cooled or uncooled infrared imaging detector technologies which may or may not be integrated with a field of view from a visible imaging detector technology.

For example, microbolometer, pyroelectric, and thermopile detector technologies may produce electrical signals corresponding to a spatial distribution of thermal energy projected onto a surface of that detector. It is practical to integrate a separate visible imaging camera having its own CMOS or other focal plane array.

For another detector technology example, an optomechanical detector may be designed to produce an optical response from a surface of the thermal imaging detector, wherein the optical response represents thermal image information, and wherein that optical response may be detected on a visible light detector such as a CMOS detector. In the latter case visible image focused from the field of view might be equal to and aligned with the thermal image information from that field of view.

Designing the apparatus to disproportionately project image information on the sensitive focal plane is accomplished using lens optics which may be either a single lens or a combination of lenses. The lens optics may be fixed without adjustment or they may be adjustable for certain purposes such as for calibration or for focusing or for alignment. Apparatuses for making such adjustments as these are dissimilar from apparatuses for relatively larger displacing adjustments as required for traditional optical zoom adjustments.

That is, according to the present disclosure images are intentionally distorted such that a greater intensity of image information is collected in a central region than in the outer periphery of a detector. Distortion correction then required in order to undo these things and create a well proportioned image result. An essential aspect of the present disclosure is a transformation which must be performed on image information produced by the detector wherein the transformation approximately removes the appearance of image distortion in final pictorial representations of image information.

The transformation contains a mathematical algorithm to model a geometric distribution of image information passing through a lens configuration onto a detector. Each lens configuration requires a particular transformation. In practice a transformation is first modeled based on physical theory, the model is tested empirically, adjustments are made to the original model, and it is further tested iteratively until desired image distortion correction is achieved.

Transform validation accomplishes calibration of the optical arrangement to avoid distortion when viewing straight lines.

The distribution of disproportioned image information across the detector is essentially a result of changing FOV of pixilated segments of the detector from the center pixel out to the corners. The algorithm used for image transformation is further used according to the present disclosure to compensate for this changing FOV for individual pixels. Near the centerline the pixel FOV is narrow since image information is distributed over larger detector area. Near the corners pixel FOV is wide since image information is relatively compressed compared to a center pixel. This FOV variation may vary continuously from centerline out or may be approximately constant over a span depending on design and configuration.

A favorable aspect of the present disclosure is the narrow FOV for pixels in vicinity of a centerline projected along the lens axis. This optimizes center pixel information compared with other images with a similar detector array. Further, this approach is orders of magnitude superior to a spot radiometer with its far larger spot size and its blindness to anything adjacent to the spot.

For a uniform electromagnetic energy source, whether in visible spectrum or infrared spectrum as appropriate for a given detector, the relatively wider FOV pixels collect more energy per unit time than the relatively narrower FOV pixels. Therefore a normalization algorithm is applied to improve image quality and facilitate radiometric calibration of the detector.

An embodiment of the present disclosure is a radiometric calibration of a single infrared imaging detector plus lens configuration with optical zoom capabilities producing wide angle and zoom angle thermal images with pixilated temperature information.

Another embodiment of the present disclosure is a calibration of pictorial transformation removing image distortion and producing both wide and zoom angle images from a single imaging detector plus lens configuration.

Whether in sequential still shot mode or in live video mode, an angular sweeping movement must yield acceptable consistency for visual or thermal information. Therefore a qualification consideration to pass calibration is the evaluation and tolerance for accepting variation in temperature or image information when a known item is viewed in different in-field angles from the centerline to FOV limit.

An aspect of the present disclosure is infrared image normalization. Infrared energy from a uniform source varies with radial position on the array because custom lens arrangement magnifies the central portion of the image. Therefore a process is used to normalize pixel output such that the display of an image from a uniform source will appear uniform.

Lens materials with good transmittance for far infrared wavelengths are typically not good for visible wavelengths and vice versa. There are some near infrared and visible wavelength ranges where one lens material can transmit both wavelengths reasonably efficiently. However for radiometric thermal imaging where temperature information is important, designers commonly select mid-infrared and far-infrared wavelengths that are usually absorbed by lens materials used for visible imaging. For this reason it is common practice to build imagers having parallax infrared and visible lens arrangements. Designers often superimpose or overlay or blend or fuse a visual image together with infrared image information to assist inspectors performing an inspection.

An embodiment of the present disclosure combines coaxial zoom image information coming from two separate lens arrangements and performing transformation to remove image distortion after said images are combined at least in part, whether by superposition or by overlay or by blending or by fusion or by combination thereof. For example particular version of this embodiment follows a blending example of RedShift Systems wherein an illumination of an infrared energy sensitive focal plane detector is captured on a CMOS detector and wherein a visible image is captured on the same CMOS detector. This approach is particularly advantageous because transformation algorithm is performed on the larger imaging array of the CMOS detector, thereby making best use of disproportioned thermal image information from a relatively lower resolution thermally responsive detector array.

The present disclosure uses lenses to project disproportioned image information onto a sensitive focal plane detector. Preferred embodiments use a lens having continuously varying optical refraction. Alternate embodiments for varying magnification from center to periphery of the detector may use multi-focal-stepped or stepped-transitional or progressive analogous to eyeglass options. An embodiment may even use a Fresnel cross section.

Figure 4:
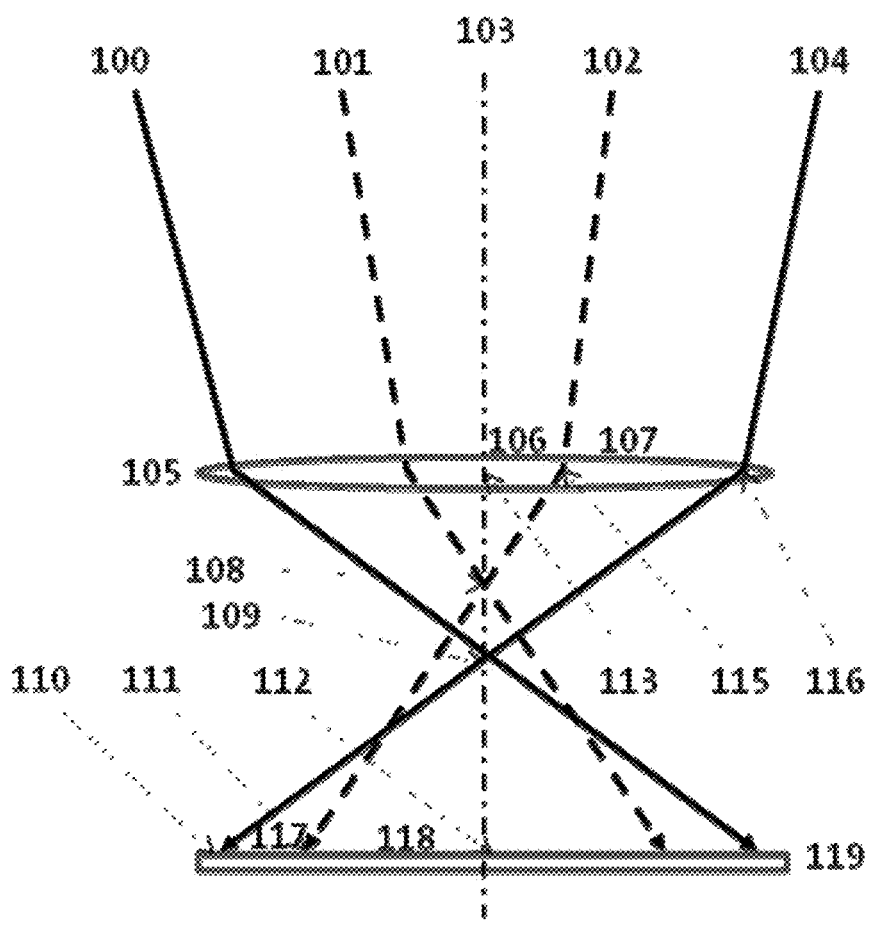
FIG. 4 diagram represents a single lens projecting disproportioned image information on a sensitive focal plane.

A preferred single lens configuration is shown in FIG. 4 and a preferred dual lens configuration is shown in FIG. 4. In the following descriptions the word "span" refers to a line revolved about a centerline and the word "position" refers either to a point on a centerline or to a point revolved about a centerline. A preferred embodiment uses axisymmetric designs implying that revolved positions are circular and that revolved spans are annular, whereas an alternate embodiment uses elliptical geometry instead of circular geometry, and whereas still other embodiments use a particular geometry design suited for a particular detector geometry to receive desired image information from an object.

FIG. 4 diagrams a single lens projecting disproportioned image information on a sensitive focal plane including the following: ray 100, ray 101, ray 102, centerline 103, ray 104, lens 105, span 106, span 107, centerline position 108, centerline position 109, position 110, position 111, centerline position 112, centerline position 113, position 115, position 116, span 117, span 118, and detector 119.

FIG. 4 depicts a diagram representation of a custom lens arrangement for magnifying the viewed image on a central portion of a detector 119 such as a pixilated sensitive focal plane array. Infrared radiation from a field of view covering the span from ray 100 to ray 104 enters lens 105. Custom lens refracts non-uniform magnification of this field of view such that a zoom-in central portion of the field of view represented from ray 101 to ray 102 is enlarged to cover a relatively enlarged aerial proportion on detector 119.

Span 106 representing a central image portion from positions 113 to 114 on lens 105 is refracted to the surface of detector 119 in span 118 from positions 112 to 111. Adjacent span 107 from positions 115 to 116 on lens 105 is refracted to the surface of detector array 119 in span 117 from positions 111 to 110.

Zoom-in magnification, z, for central image portion from ray 101 to ray 102 compared with field of view from ray 100 to ray 104 is therefore approximated by the following calculation:

$$z=(\text{span } 118 \times \text{span } 107)/(\text{span } 117 \times \text{span } 106).$$

A line from position 116 on lens 105 to position 110 on detector 119 crosses centerline 103 at position 109 below a position 108 where line from position 115 on lens 105 to position 111 on detector 119 crosses centerline 103. A distance from position 109 to 108 can potentially create an out of focus on a portion of the image information on detector 119. Geometric aspects such as these are mathematically modeled in a transformation algorithm used to translate detector outputs into image data.

Figure 5:
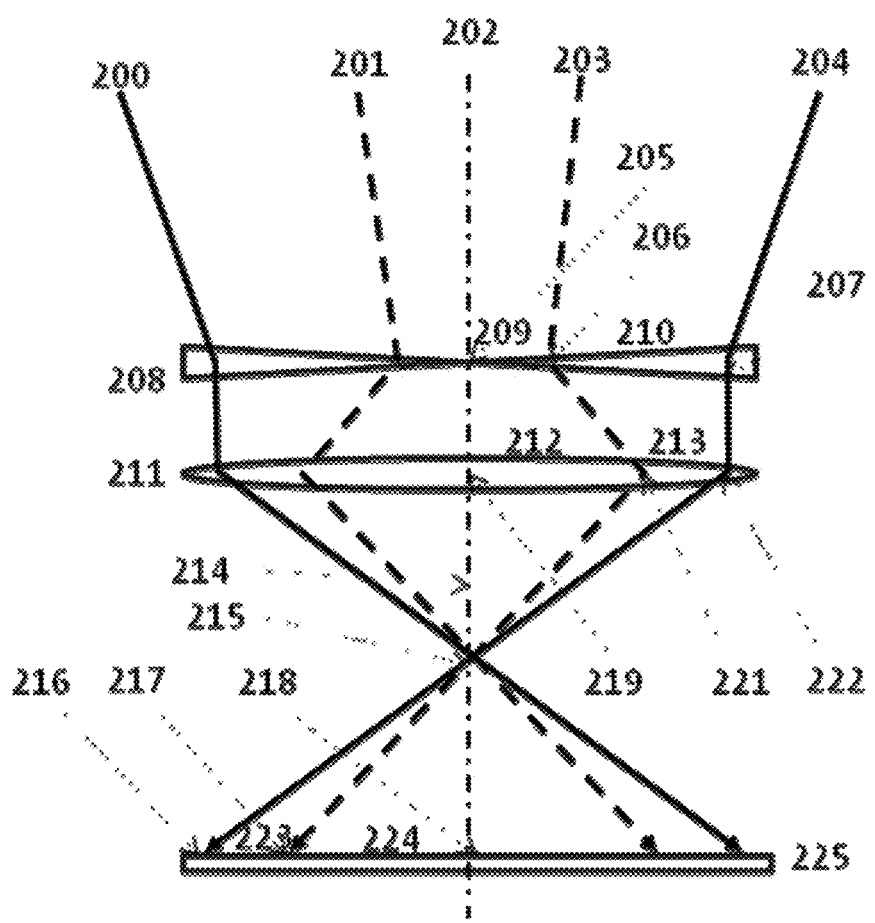
FIG. 5 is a somewhat schematic depiction of a multiple lens configuration projecting disproportioned image information on a focal plane.

FIG. 5 diagrams multiple lenses projecting disproportioned image information on a sensitive focal plane including the following: ray 200, ray 201, centerline 202, ray 203, ray 204, centerline position 205, position 206, position 207, lens 208, centerline position 209, span 210, lens 211, span 212, position 213, centerline 214, centerline position 215, position 216, position 217, position 218, centerline position 219, position 221, position 222, span 223, span 224, and detector 225.

Those skilled in the art may accommodate aspects of a particular thermal imaging and visible imaging information as these things relate to thermal and visible image detector technology. There are many types of cooled or uncooled infrared imaging cameras which may or may not be integrated with visible imaging cameras.

For example, microbolometer, pyroelectric, and thermopile detector technologies may produce electrical signals corresponding to a spatial distribution of thermal energy projected onto a surface of that detector. It is practical to integrate a separate visible imaging camera having its own CMOS or other focal plane array.

For another detector technology example, an optomechanical detector technology may be designed to produce an optical response from a surface of the thermal imaging detector, wherein the optical response represents thermal image information, and wherein that optical response may be detected on a visible light detector such as a CMOS detector. In the latter case visible image focused from the field of view might be equal to and aligned with the thermal image information from that field of view.

A preferred embodiment of the present disclosure is implementation of the aforementioned coaxial zoom aspects for in-field inspection and surveillance. Typically this requires a handheld data collection and imaging device such as that portrayed in FIG. 6.

Figure 6:
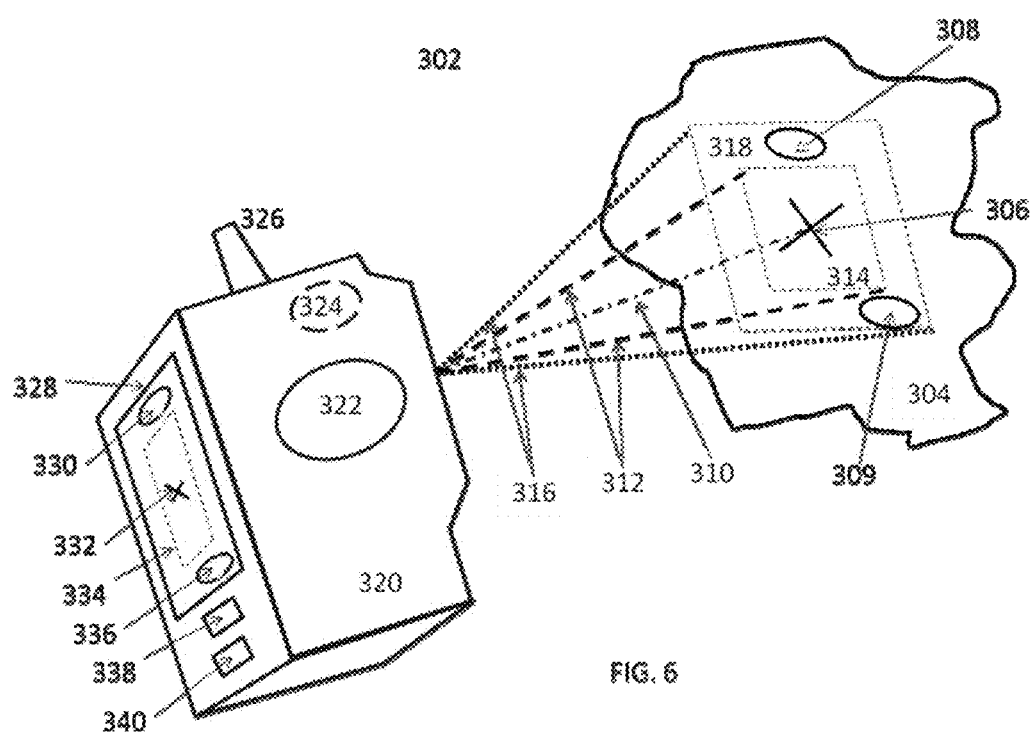
FIG. 6 is a somewhat schematic depiction of a survey instrument used for in-field inspection, including coaxial zoom.

FIG. 6 portrays a survey instrument used for in-field inspection including coaxial zoom including the following: inspection area 302, inspection vicinity 304, point of interest 306, distinguishable item 308, distinguishable item 309, centerline 310, zoom FOV angle 312, zoom image inspection area 314, wide FOV angle 316, wide image inspection area 318, imaging survey instrument 320, user controls 322, position tracking system 324 such as GPS, wireless link 326, display 328, displayed item information 330, displayed point information 332, zoom image area outline 334, display item information 336, wired link 338, and removable memory 340.

Coaxial zoom is particularly useful in certain in-field inspections where an inspector surveys an inspection vicinity 304 of an inspection area 302 as described by Garvey in U.S. Pat. No. 7,454,050 and further comprises a point of interest 306 within the inspection vicinity 304. According to the present disclosure the inspector brings the point of interest 306 into the zoom FOV angle 316 of an imaging apparatus 320. This achieves relatively greater detail of image information immediately surrounding the point of interest 306. Furthermore it gains additional information with relatively lesser resolution from a wider inspection area 318 around the periphery of the point of interest 306. For example the inspector often identifies one or more distinguishable items 308 and 309 which assist the inspector in one or more ways such as establishing dimensional proportion within an image area or making other geometric comparison as; identifying reference physical information; providing an "A" versus "B" comparison between similar things under similar circumstances; or indicating reference points for thermal data such as delta-temperature from ambient or delta temperature between normal and abnormal performance.

The coaxial zoom apparatus is advantageous for producing thermal image data for trending over long time intervals. The relatively more intense thermal image data in a zoom image information area 314 is superior and provides for better accuracy to identify and measure thermal information than prior art methods having average and uniform thermal image data distribution collected using a similar thermal imaging detector. This disclosure improves the usefulness of low cost thermal imaging array, saving expense and complexity.

The identification of at least two points from the distinguishable items 308 and 309 and the point of interest 306 is useful for overlaying and otherwise associating multiple images of the same object area. This is particularly useful for comparing a historical image from memory with an in-field generated image, and for blending, fusing, or overlaying visible and thermal image information. As previously mentioned, if any data element record corresponding to any data element requirement is missing, a survey instrument is typically programmed to prompt the operator to qualify (collect, correct or explain) the missing data. Often, the survey instrument is programmed to electronically refer to an electronic base of knowledge to derive an instruction for the operator regarding how to acquire data corresponding to the missing data element requirement. One method for deriving an instruction for the operator is to retrieve an historical image from memory and identify on the image where the missing data element may be collected.

Position tracking system 324, wireless link 326, user controls 322, wired link 338, and removable memory 340 are each in common use for inspection imagers. These devices are included in this description of the present disclosure because they are each complementary to using coaxial optical zoom for handheld walk-around inspection and surveillance applications. For example motion tracking or transmitter triangulation or GPS or geosense or laser range detector assists with identifying location of an inspection vicinity 302 so that an operator may download information about a point of interest 306 using a wireless link. These links, controls, and memory all assist a user of the imaging apparatus 320 in performing an intended inspection or surveillance operation focused on a thing of interest 306 within a zoom image inspection are 314.

Simplified inspection and reporting is an important aspect of the present disclosure. Coaxial zoom simplifies the capture and reporting process as one can see by comparing a six-step sequence with a 14 step sequence outlined in Tables 2 and 3 below.

TABLE 2

Capture and reporting traditional zoom.

Step Traditional zoom sequence:

1. find an object in FOV using imager at relatively lower magnification,
2. optional focus on the object,
3. capture and view a wide image of the object,
4. optional annotate the wide angle image with inspection information
5. save wide image,
6. adjust lenses for zoom to find object in FOV using imager at relatively higher magnification,
7. optional focus on object,
8. capture and view a zoom image of the object,
9. optional annotate the zoom image with additional inspection information,
10. save zoom image,
11. identify and transfer the wide and zoom images to a computer
12. locate and copy and paste wide image from computer drive to a report,
13. locate and copy and paste zoom image from computer drive to the report, and
14. view, edit, and print the report.

TABLE 3

Capture and reporting with coaxial zoom.

Step Coaxial zoom sequence:

1. find an object in FOV using coaxial imager,
2. optional focus on the object,
3. simultaneously capture and simultaneously or sequentially display both a wide image and a zoom image of the object,
4. annotate images with inspection information,
5. save a record in imager memory with a disproportioned image information, with two corrected and proportioned images, and with annotation information,
6. assign the record to a template which in turn creates an automatic report and sends the report to a printer, and sends the record and report to a programmed computer.

Inspection with a Survey Instrument.

Route-based inspections are described by Piety in U.S. Pat. No. 5,386,117 wherein an infrared camera operator is prompted through sequential measurement points within a plant environment. Survey-based inspections are further described by Garvey in U.S. Pat. No. 7,454,050 wherein a camera operator is prompted through an inspection of a vicinity of an area. The present disclosure supports both approaches and provides several advantages.

From these listed publications it is apparent that there many ways to detect, locate, and measure many things during a survey. With each technology there are superior, adequate, and inadequate procedures to perform a survey inspecting of a vicinity of an area; there are capabilities and limitations the suggest preferences among available technologies; and there are associated interferences and other shortcomings. Operators need assistance, guidance, and training to minimize adverse consequences from false negative findings, where an operator using a survey apparatus failed to detect or locate or perform adequate measurement, and from false positive findings where an operator using a survey apparatus reported situations that were not correctly detected or located or problematic.

Alternate embodiments of the present disclosure employ electronically readable tags such as radio frequency identification (RFID) or barcode or electronically readable memory or the like at locations to be inspected. A selection of which electronically readable tag technology gets used in a given application is based on functional differences, functional requirements, and compatibility with survey instruments, cost, and ease of use. For these alternate embodiments, the operator uses the survey instrument or another portable device to interrogate the electronically readable tag to acquire at least identification (ID) associated with that tag at that location and different from other tags at other locations. The ID is used with programmed logic and a lookup table to associate other information relevant to that location such as equipment history, component information, location identity, inspection points, alarm status, or similar information helpful for an operator or inspector in performing his or her assigned tasks in this location. Some types of electronically readable tags have read and write capability which is used by survey instrument operators to leave behind information or coded information regarding operator identity, chronological information, inspection results, notes, or similar data worthwhile for notice to others who may electronically read left-behind information. For example location tagging may incorporate RF-ID and or barcode such as 2D barcode. A tagged leave-behind configuration can provide a form of distributed database of information wherein any field worker may use an appropriate electronic reading device to upload to that device information relevant to items of interest within proximity of the leave-behind point location.

One advantage of the present disclosure inspection on basis of a route or a survey or both is associated with coaxial zoom imaging wherein a close up image of a point of interest is captured and saved together with a wider angle view of the same point along with peripheral items associated by proximity with the point of interest. This is particularly advantageous when other sensors such as electromagnetic or ultrasonic survey sensors also make approximately simultaneous measurements in vicinity of this point of interest.

A second advantage of the present disclosure particularly for survey-based inspection operations is the ability if desired to record 100% of a portion of a survey so that instead of simply delivering an exception-type report, an operator may automatically create a comprehensive report showing everything that was inspected so that one can later prove with assurance that nothing significant was left out. In this case it may be helpful to associate outputs from other survey transducers with a video image file, such as on the audio track normally tied to an image file, so that a user may replay a set of simultaneous measurements.

A third advantage of the present disclosure for route-based inspections is map-consciousness of the present disclosure due to availability of position tracking. This can be used to guide an operator from point to point along a route, not simply tell the operator where he or she needs to go. This also can be used to validate that an inspection surveyor actually went to every point, at what time, how long was spent there, what measurements were made, and what results were recorded. Temporal awareness, sensing awareness, and spatial awareness of the present disclosure are particularly advantageous compared to earlier survey capabilities.

A fourth advantage of the present disclosure for route-based and survey-based inspection is the capacity and capability for a programmable survey instrument to use programmed logic in conjunction with operational experience captured in a computer accessible base of knowledge to perform predictable and repetitious tasks and to rely on operator input on matters of qualitative assessment where information is incomplete or human judgment is required for a reasonable interpretation. This simplifies the operator's job and thereby enables a less experienced or less well-trained operator to perform more complicated surveys while achieving more comprehensive results and reports. The following aspects of the present disclosure make it more intuitive, simpler to use, and less prone to report false positive and false negative indications:

a. In preferred embodiments the devices and methods are (i) position tracking sensitive, have (ii) short term memory covering recent measurement history, and have (iii) programmed logical rules derived from (iv) a base of knowledge regarding to a selected type of survey done by a surveyor with a survey instrument incorporating the short term memory information. The base of knowledge information in prior art had to be taught in classes and detailed in user manuals, teaching operators how to use the survey instrument to perform a survey with primary teaching focus on what the operator sees and does while reading the instrument display. For example, in prior art, an operator using a locator may be called upon to observe and recall recent measurements while moving or swinging a survey instrument through a range of forward-backward-forward or left-right-left motions.

b. In preferred embodiments of the present disclosure programmed logic further identifies problematic conditions encountered by operators when using survey instruments through use of (v) programmed logic rules for good and consistent measurement based on (iv) base of knowledge information such as "difficult locates" and "interferences" and "obstructions" and "warnings" described in the base of knowledge.

c. In preferred embodiments the present disclosure a survey instrument display 3 shows an operator (vi) where he or she is located relative to an earlier position or a reference point A or B, (vii) where an object of interest D or a point of interest is detected relative to his or her position or relative to a reference point A or B. This "you are here" and "it is there" and "you will find another thing of interest in another place" capacity greatly simplifies an operator's task while performing either a route-based inspection or a survey-based inspection.

d. In preferred embodiments the present disclosure (viii) employs the nature of "geosense" associating things of interest for which the processor in the survey instrument has been previously programmed with an aspect of proximity compared to where an operator is located or to where an object of interest or point of interest E is located while the operator is standing at a place during an inspection. Effectively, this concept of geosense avails an operator an opportunity to display various items within an area G and within a vicinity of an area such as a radius around point C.

e. In preferred embodiments wherein exception-based reporting is employed the present disclosure reduces immense amounts of data produced by sensor information from a survey instrument into a relatively small number of validated using programmed logic and using multiple sensing techniques and documented findings. The present disclosure typically uses redundant sensing techniques to interrogate a vicinity of an area when performing a locate function or when making a measurement. To accomplish this programmed processor uses programmed logic with knowledge base to review short term memory measurements and guide an operator when performing an inspection (referring to "a", "b", and "c" above). An operator uses his or her human judgment to accept and record findings which become recorded and reportable.

f. In preferred embodiments the present disclosure (ix) analyzes operator responses or stepwise actions in comparison to programmed logic knowledge base of expected responses or stepwise actions, then (x) prompting the operator when a particular action has increased likelihood of producing a false positive or a false negative result, (xi) providing text or graphic or audible indication or explanation regarding a rational for the prompting, (xii) suggesting alternate(s) or work around(s) or further measurement(s) potentially able to improve satisfaction or reliability or favorability of results or findings. In effect these things enable programmed logic supported by knowledge base associated with a survey instrument enable the survey instrument to assist an operator by asking a question similar to this, "Do you know you may have missed [whatever it may be] because of [whatever the triggering indication may be]?" or "You may be better served by making redundant measurements using [whatever logic suggests from available resources]?" or "Do you know this survey instrument is making measurements outside of its as-calibrated range of measurements?" Based on an operator's response a reply supported by programmed logic is communicated to the operator and a record is made in electronic memory associated with the survey instrument and is available for subsequent reading or reporting.

g. In preferred embodiments the present disclosure (xiii) tests or validates or authenticates operator responses to qualify an operator's skill or awareness or familiarity or other qualification and (xiv) programmed logic acts upon this test result to affect how the survey instrument responds to that operator's commands. In this as in other question and answer dialog with an operator, programmed logic is used to create a record in electronic memory associated with the survey instrument and is available for subsequent reading or reporting.

Analysis with a Survey Instrument.

The present disclosure is particularly advantageous for inspection and surveillance wherein the in-field inspector can interpret infrared image information regarding a point of interest 306 and use a programmed processor within the imaging apparatus 320 to translate thermal image information combined with additional information into inspection findings as described by Garvey in U.S. Pat. No. 7,528,372. The translating thermal image information step typically employs a model. For example the following data in Table 4 is from an unpublished empirical study performed for Emerson Electric Company by Elecrophysics Inc. In this example, the coaxial imaging apparatus may be programmed with a model similar to that shown in FIG. 8 wherein axis 402 corresponds to delta-temperature data and axis 401 corresponds to resistance data.

TABLE 4

| Current (A) | Voltage (V) | Resistance (Ohms) | Power (W) | Temperature (C.) | Delta Temperature (C.) |
|---|---|---|---|---|---|
| 0.3 | 0.698 | 2.33 | 0.21 | 34 | 14 |
| 0.3 | 1.03 | 3.43 | 0.31 | 39 | 19 |
| 0.3 | 1.354 | 4.51 | 0.41 | 46 | 26 |
| 0.3 | 1.613 | 5.38 | 0.48 | 49 | 29 |
| 0.3 | 1.861 | 6.2 | 0.56 | 54 | 34 |
| 0.3 | 2.61 | 8.7 | 0.78 | 68 | 48 |
| 0.3 | 2.89 | 9.63 | 0.87 | 77 | 57 |

Figure 8:
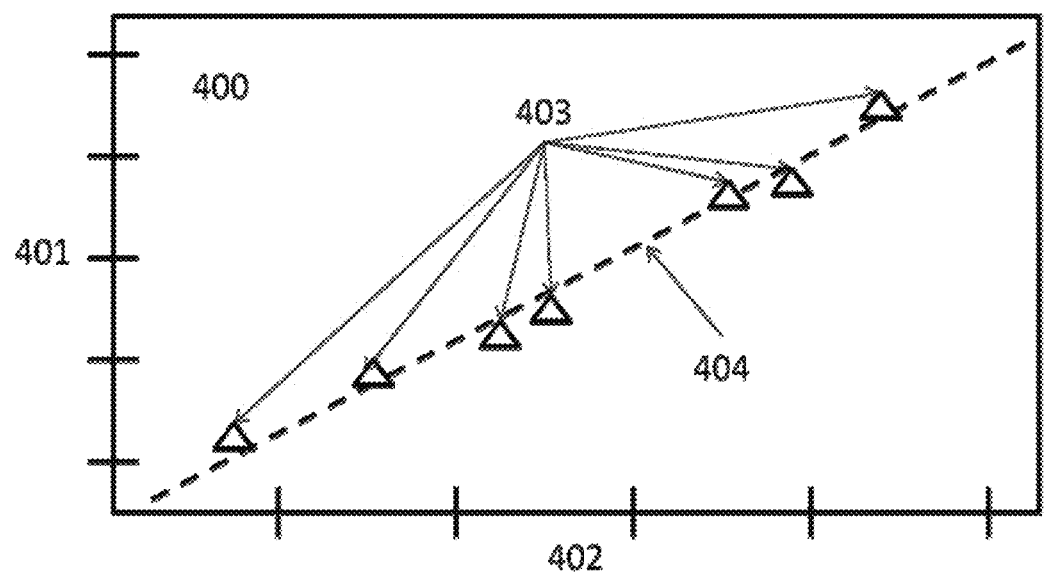
FIG. 8 is a graph showing an exemplary model for calibrating an instrument or for converting measurand values.

FIG. 8 portrays a model for translating coaxial zoom measured values including the following: model 400, axis 401, axis 402, data points 403, and curve fit line 404. This information may be used to calibrate a translation of thermal measurements represented by say an abscissa axis 402 value into meaningful electrical property values represented by ordinate axis 401 using a calibration curve fit line 404 wherein the thermal measurements are made using a radiometric thermal imaging apparatus. For example the abscissa axis 402 may represent a temperature or a delta-temperature and the ordinate axis 401 may represent an electrical resistance or a change in electrical resistance.

There are many other survey instrument data analysis applications taught by Garvey in U.S. Pat. No. 7,528,372 which are suitable for improved by use of coaxial zoom thermal imaging.

Reporting from an Operator with Survey Instrument to a Customer.

According to preferred embodiments the present disclosure report templates 350 are formatted for ease of use and interpretation. White space in report template 350 is typically used to display information associated with nearby images: annotations, time, location, findings, data, apparatus information, ambient temperature, operator identification, duration, record storage information, and sequence information. Images 352 to 362 are typically arranged in a logical and regular or standardized order to cause reports to be quickly and effectively interpreted. These images are normally paired with wide and zoom images adjacent, with visible and thermal images adjacent, and with blended or other visible plus thermal images in a similar logical arrangement.

According to further embodiments of the present disclosure data, results, and findings from a survey instrument are uploaded periodically into a web-based application.

The present disclosure advances beyond these background analysis and reporting applications primarily in relationship to advancements in survey instrument methods and apparatuses described above including: record keeping and graphical mapping of survey instrument position tracking, record keeping and local mapping of a vicinity of an area associated with locator usages, incorporation of imaging into locator surveys, automatic incorporation of coaxial optical zoom as a measurement record, uploading and downloading inspection information thereby facilitating improved inspection default processes, further analyzing data and results to deliver better findings with less false indications, and customer understandable reports that are immediately available with improved usefulness.

Wireless uploading and downloading of data and programmable information between a base station or web connection and a survey instrument. The present disclosure uses available wireless infrastructure such as cellular communications or interne service provider services or another effective wireless service application to create and establish reasonable communications links between the base station or web link and a survey instrument. Different services and protocol may be used in a field setting compared to an office environment.

Completion of a record reporting process involves prompting or creating work tickets and tracking to validate work that is completed. For example a survey report that suggests remediation services should further be appended to show what services are requested, from what service provider, status of work completion, cost, materials, further findings. Completion of the services typically is followed by verification of remediation and closure of associated tagged items within a record system.

Records Worth Keeping.

An important aspect of the present disclosure is this many-fold reduction of large source data into a single piece or a few bits of meaningful, understandable, and usable information suitable for documentation and reporting. Accumulation of libraries of raw data and analyzed information is useful if these libraries can be parsed, searched, sorted, and interpreted. These things rarely get done unless someone, a human with a purpose, has a concept that what they are looking for exists and is likely to be found. In practice this approach is hit-or-miss and often incomplete. The present disclosure overcomes these challenges by parsing, searching, sorting, and interpreting in approximately real time during the survey while the inspection surveyor is collecting and or analyzing the source data.

What are the steps for many-fold reduction of large source data into small bits of meaningful, understandable, and useable information?

a. An inspection surveyor uses a programmable survey instrument 1 with position tracking enabled wherein an application software routine accesses a first base of knowledge pertaining to a using of a survey instrument 1 by an for acceptable survey of the vicinity of an area, b. an application software routine accesses a second base of knowledge pertaining to the survey instrument's detector indications of an object of interest D, c. an application software routine accesses a third base of knowledge pertaining to the survey instrument's detector indications of an object not of interest F and how that object not of interest F might be distinguished from the object of interest D, d. the surveyor is guided by an application software routine while inspecting the vicinity of an area performs a locate and applies a marking associated with an object of interest D, e. an application software routine prompts the surveyor to capture an image of the marking, f. an application software routine assigns a level of relative importance to this locate, g. an application software routine assigns and associates a relationship characteristic to records retained in electronic memory of the image, the locate, the position tracking, and the level of relative importance, h. at least the locate, the position tracking, and the level of importance are transmitted to a peripheral device, i. an application software routine operates on a fourth base of knowledge pertaining to map information in conjunction with the position tracking or the locate and performs graphical map representation of at least the locate in relationship to at least a portion of the area Graphical Mapping of a Route-Based or Survey-Based Inspection.

Piety in U.S. Pat. No. 5,386,117 disclosed prompting an operator to follow a route-based inspection sequence using text instructions to guide an operator. Garvey in U.S. Pat. No. 7,561,200 teaches using survey templates to guide an operator through a survey of a vicinity of an area wherein that inspector may use GPS to assist with finding location information. The present disclosure employs graphical mapping shown on a display (such as 3 or 324) of a survey instrument (such as 1 or 320 or 420) to assist an operator with locating the operator's position, the boundary of the area of interest G, an object of interest D, a point of interest E, a point not of interest F, in addition to other objects relevant to a survey of a vicinity of an area and spatial information such as distance or azimuth or proximity for associating these varied items.

A dynamic mapping system like this improves a surveyor's experience by graphically showing close perspective representation of a vicinity near an object of interest or a vicinity near an operator or an entire area of interest or that which is outside an area of interest. A time sequenced recording of map information together with sensor information can be used to document a completeness or a lack of completeness for a survey. This type of record shows exactly what happened, because it is documented. It provides a training example for instructing others to perform similar or identical surveys including stepwise sequence for inspection, identification, confirmation, recording, analyzing, finding, reporting, and transmitting.

A mapping capability of the present disclosure enables an operator to enter entirely unfamiliar survey territory with fact based confidence that survey can be efficiently, accurately and completely performed in a prescribed time interval because the mapping routine accounts for distances, speeds, and tasks making up the survey covering territory with which the operator is previously unfamiliar.

This capability exists because programmed logic L operates on a base of knowledge P having to do with mapping information and on a base of knowledge O having to do with area information associated with a survey.

Documented Uses of Imaging Connected with Other Sensor Findings.

Garvey in U.S. Pat. No. 7,706,596 introduces combination of dynamic signal analysis with imaging analysis. U.S. Pat. No. 7,706,596 is incorporated in its entirety herein by reference. The present disclosure further advances the art through such elements as the addition of imaging with sensor findings and survey proximity details.

According to the present disclosure an operator uses a survey instrument to inspect a vicinity of an area. Position tracking is employed to monitor and record positions of the operator or the survey instrument through the survey process. Furthermore a locators-type survey instrument locates unseen objects of interest D and not of interest F in positions relative to the surveyor. Still further, coaxial zoom imaging is used to document close-up aspects and wider view information, typically for an object or a point of interest.

In a preferred embodiment, preformatted reports are automatically generated which provide intuitive and easily understood findings using side-by-side close-up and wider angle images, sensor outputs, map information, operator findings, and operator notes.

Default Coaxial Zoom Analysis and Documentation.

As explained earlier, certain embodiments of the present disclosure use fixed lens optics to produce disproportioned focal plane image representation to effectively support creation of coaxial zoom images (close-up and wider angle) wherein a mathematical transformation of image data attempts to remove effects of disproportioned focal plane image information.

In a default setting the present disclosure creates a central image with close-up perspective with a wider view image with wider-angle perspective each time a snapshot image is triggered. These two images are typically automatically reported side-by-side in a documented report (electronic or hard copy) and template formatted adjacent to or in relational association with other temporal or spatial relevant survey details including time, date, location information, measurement information, analysis information, findings, and notes.

Strategic Reduction of False or Otherwise Unwanted Indication.

A recurring theme of the present disclosure involves elimination of superfluous data, while clearly and concisely reporting survey results and findings. It is uncommon that one needs to document and report 100% of all data, results, and findings from a survey. Instead most customers, parties paying directly or indirectly for the valuable outputs from a survey, want only the important facts.

For the sake of discussion, we will assume 99.9% of all the data passing through a survey instrument is not relevant and the remaining 0.1% is relevant, valuable, and should be reported. How do you sort out the relevant from that which is not? Simple decimation, keep one value, throw out 999, keep one, throw out 999, and so on, is obviously not going to do the job well because the important bit is probably in the 999 each time a decimation process tosses out data.

According to the present disclosure programmed logic L operates on bases of knowledge M, N, O, and P to assist an operator during the performance of a survey, with design to bring the operator's attention to an object of interest D, while not being misguided by an object not of interest F. Furthermore the logic operating on knowledge assists the operator to find a point of interest E on the object of interest D.

The strategy of the present disclosure for eliminating large portions of data and results, while documenting and reporting in concise and efficient manner results and findings of greatest importance involves (i) using the programmed logic operating on bases of knowledge to perform well characterized, predictable, and fully understood functions performed during a particular survey, and (ii) using operator logic in the form of experienced human judgment to oversee the prudent application of programmed logic operating on bases of knowledge to perform these tasks and to make selections and determinations raised by the programmed logic. This strategy simply stated is to use the processor programmed with logic to do what it does best, perform defined quantitative repetitive processes, while using the human for what a human does best, perform qualitative interpretations to make decisions based on relative assessments and incomplete information.

Reports that are Immediately Available with Improved Usefulness.

The present disclosure improves survey reporting practices by semi-automatic creation of reports having concisely stated understandable information. These things are the result of the forgoing steps and apparatuses.

One way reporting is improved in accordance with the present disclosure is through the use of paired images created using co-axial zoom apparatus, wherein the images are closely associated with temporal or spatial relevant survey details including time, date, location information, measurement information, analysis information, findings, and notes.

Another way reporting is improved in accordance with the present disclosure is through strategic elimination of superfluous while clearly and concisely reporting survey results and findings.

Yet another way reporting is improved in accordance with the present disclosure is by use of web-based report templates which receive survey results, survey findings, and survey notes associated with temporal and spatial relevant survey details. Such web based application software may be programmed to combine these details with formatted templates, and completed reports may be accessed by customers anywhere at any time.

These report templates may be configured or adapted following preferences of individual or collective customers such that each customer receives his or her preferred information in a preferred format via a desired media.

Diagrammatic Survey Illustrations.

The FIG. 9 diagram represents a handheld survey instrument with accessories such as survey instrument 420, belt with accessory clips 430, and accessories 440. This illustrates ergonomics, portability, convenience, and adaptability such that a survey instrument is safe, practical and easy to use in a field environment.

Figure 10:
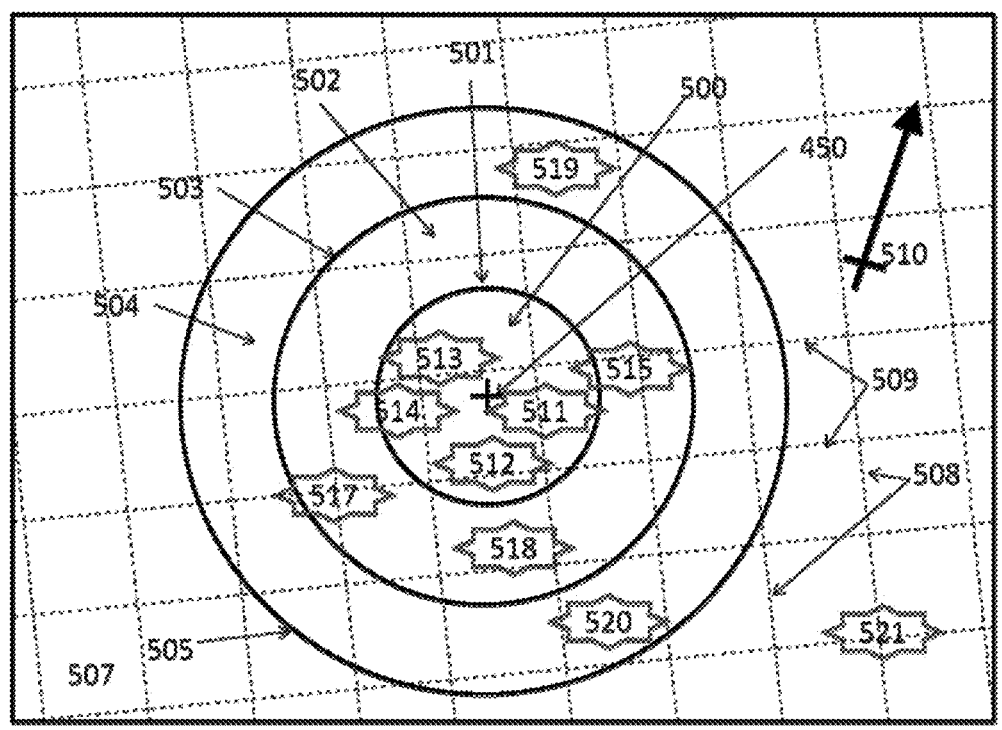
FIG. 10 is a somewhat schematic depiction of high, low, and sporadic resolution information displayed in proximity to a mark.

FIG. 10 diagram depicts high, low, and sporadic resolution proximities to a mark such as mark 450. This mark may be an in situ icon representing a place or location, or representing an operator location, or representing a survey instrument, or another spatially identified person or place or thing. Around mark 450 is a high resolution proximity 500 wherein a relatively more intense aggregation of meaningful information gets assimilated. The meaningful information may be measured either directly using the survey instrument or an accessory to the survey instrument or indirectly such as by use of sensory capabilities of a survey instrument or by operator observations or by a combination among these. Surrounding a high resolution proximity 500 is a high resolution proximity boundary 501. Outside a high resolution boundary 501 is typically a low resolution proximity 502 wherein relatively lower resolution or relatively lesser amounts of meaningful information are assimilated.

An aspect of the present disclosure involves the assimilating of meaningful information within one or more proximate boundaries of a mark which may be a cursor on a coordinate system or an operator's location. The assimilating step is a process of accumulating first one piece of information, then another, and another, and so on until the operator stops or until there is not any more meaningful information or available information. A rate of assimilating is normally bandwidth limited. For example when meaningful information is first searched within an electronic base of knowledge and then imported to active computer memory and displayed on display 3, then a rate limiting step may be a radio transmission bandwidth limitation when uploading or downloading information between remote locations. For another example when meaningful information is collected by surveying a vicinity of an area, identifying objects of interest, locating these objects and associating the locations with a frame of reference and a coordinate system, storing this information in a memory, using programmed logic to read and interpret the memory and to display the objects on a display 3, then a rate limiting step may be a rate of manually surveying the vicinity of the area.

Surrounding that proximity is low resolution proximity boundary 503. Outside of that boundary is sporadic resolution proximity 504 which is surrounded by sporadic resolution proximity boundary 505.

Context for data in FIG. 10 is assisted by frame of reference 507, coordinate system 508 and 509, and reference azimuth 510. This figure also shows data or objects of interest or objects not of interest 511 to 521.

A method for gathering relatively higher resolution spatially resolved quantitative data or other information in a relatively close proximity 500 to a mark is an embodiment of the present disclosure. This gathering process can be quick or slow depending on the steps. Sometimes this is accomplished using a sensory interrogation within a discernable proximity range 501 of a handheld survey instrument. In this case an operator using a survey instrument typically observes a display and thereby identifies things of interest from things not of interest. It is common for sensor measurement characteristic such as a signal strength or a signal accuracy or a signal-to-noise ratio to diminish with distance or distance-squared or distance-cubed.

In another circumstance the operator imports and displays quantitative data or other information is requested from a historian or other database such that spatially resolved information is requested, identified based on proximity to a coordinate, and delivered to the requestor and a relatively greater concentration of data or other spatially resolved information comes in nearby mark 450 in proximity 500 within a time interval than what is received in the next outer annular proximity 502. An operator may move a cursor type mark 450 on the display and witness the uploading of data or other information of interest as it populates proximities 500 and 502.

Outbound of proximity 502 where relatively low resolution of information accumulates FIG. 10 depicts proximity 504 wherein data accumulation becomes less intense and more sporadic.

Figure 11:
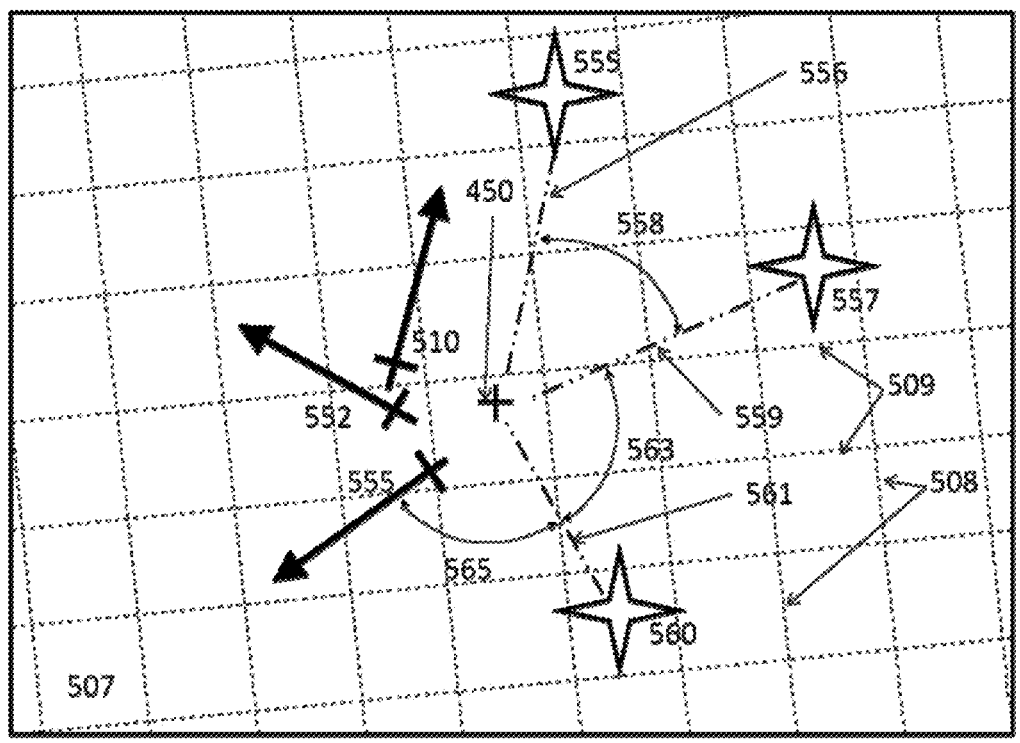
FIG. 11 is a somewhat schematic depiction of a graphical method for locating by triangulation.

FIG. 11 diagram shows examples of triangulation. A marker such as mark 450 may be physically located in a frame of reference 507 using at least a portion of the following: a coordinate system 508 and 509, reference azimuths 510, 552, and 555, reference points 555, 557, and 560, reference angles 558, 563, and 565, and reference distances 566, 559, 561. Those skilled in the art of geometric locating understand how physical locations, angles, and distances such as these may be used to locate a mark 450 and associate it within a system of coordinates 508 and 509.

Figure 12:
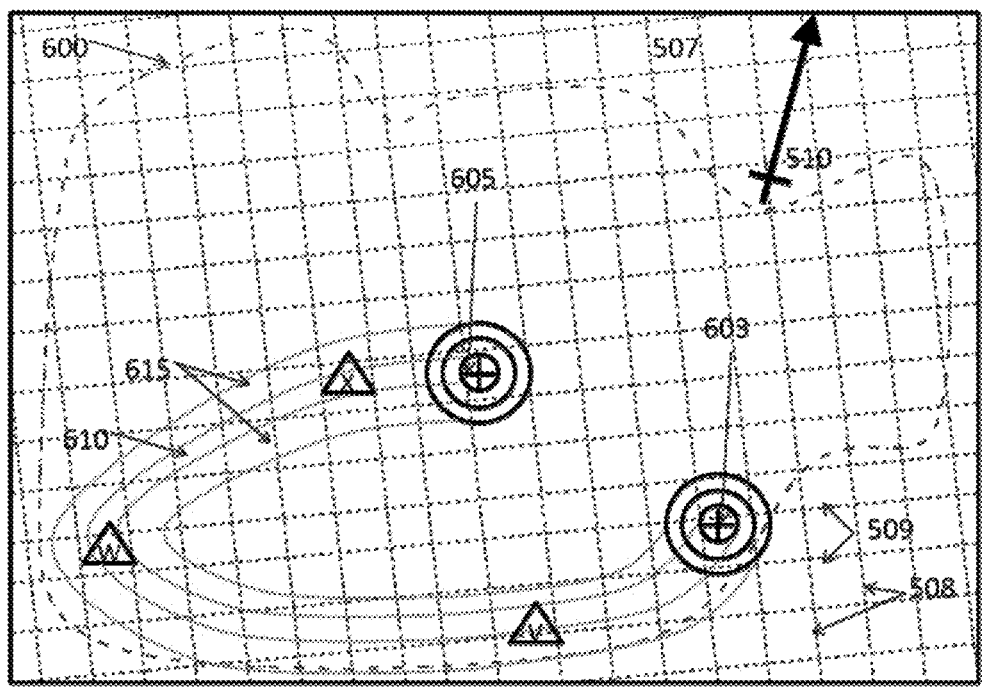
FIG. 12 is a somewhat schematic depiction of an example of accumulating relatively high resolution data.

FIG. 12 depicts an accumulation of high resolution data as a survey is marked off from a mark with high, low, and sporadic resolution proximities 603 to a similar mark 605. This figure shows a frame of reference 507, coordinate system 508 and 509, reference azimuth 510, an object or a point of interest or a point not of interest represented by each of V, W, and X, a high resolution data collection region 610, a low or sporadic resolution data collection region 615, and a boundary for area of interest G.

FIG. 12 shows how an operator may build up an accumulation of meaningful measurand data or other relevant information on a display for a survey instrument by walking a survey route carrying a sensory survey instrument or by moving a display cursor type marker along the areas shown between markers with proximities 603 and 605. This process may be extended, repeated, or stopped and restarted, as desired by an operator until the operator feels a survey is sufficiently complete.

Figure 13:
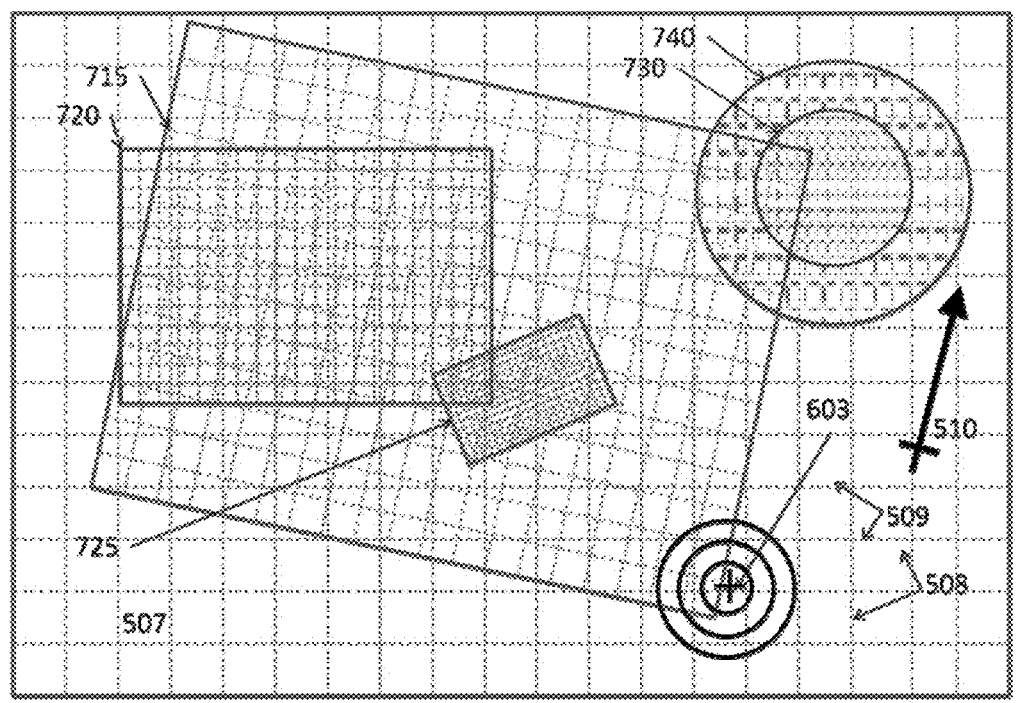
FIG. 13 is a somewhat schematic depiction of a image formed by a stitching together of images or other spatially resolved information.

FIG. 13 depicts stitching to join images and other spatially resolved information. Stitched images and other information can be displayed for operator viewing in a format of choices such as opaque or semi-transparent overlay, or such as symbolic identifier, or such as text or graphical messaging. Shown in this figure are a frame of reference 507, coordinate system 508 and 509, a reference azimuth 510, multiple images 715, 720, and 725, a mark with high, low, and sporadic resolution proximity data 750, a coaxial higher resolution data 730, and a coaxial lower resolution data 740.

A coordinate system 508 and 509, an azimuth 510, and a frame of reference 507 may be used to accomplish steps of proportioning or orienting or distorting as needed for each item with respect to the things reflected on the display. In this case the term item refers to an image 715, 720, 725, and data set 730 and 740, or proximity information 603.

Alternatively stitching may be manually assisted by an operator on the display of a survey instrument typically using observation, overlay, proportioning, distortion, and orientation tools to arrange each item in position on the display.

Figure 14:
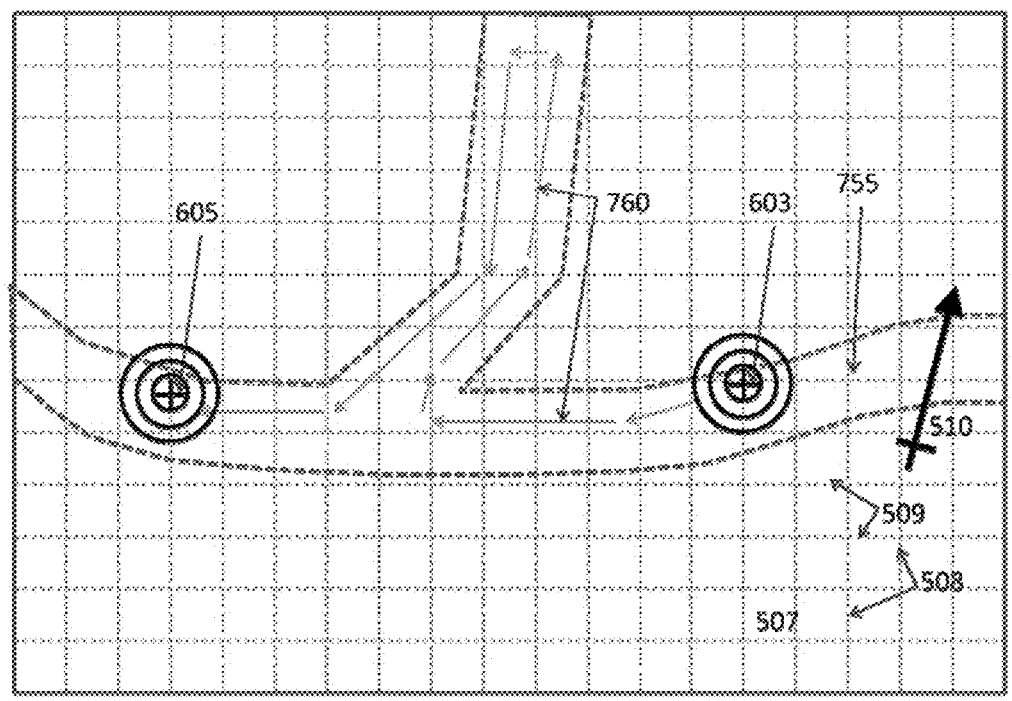
FIG. 14 is a somewhat schematic depiction of an image illustrating a safety inspection of a right of way.

FIG. 14 depicts a safety inspection of a right of way. Included with this figure is a frame of reference 507, a coordinate system 508 and 509, reference azimuth 510, a mark with high, low, and sporadic resolution data proximities 603 and 605, a right of way 755, and an inspection pattern 760. An operator accumulates the information needed to accomplish a safety inspection by choosing a logical pattern 760 and following that pattern by walking it carrying a survey instrument. Alternatively or additionally an operator may indicate a pattern 760 on a display for a survey instrument and allow time for the instrument to accumulate high, low, and sporadic resolution data or other information from a historian or other database having base of knowledge.

Figure 7:
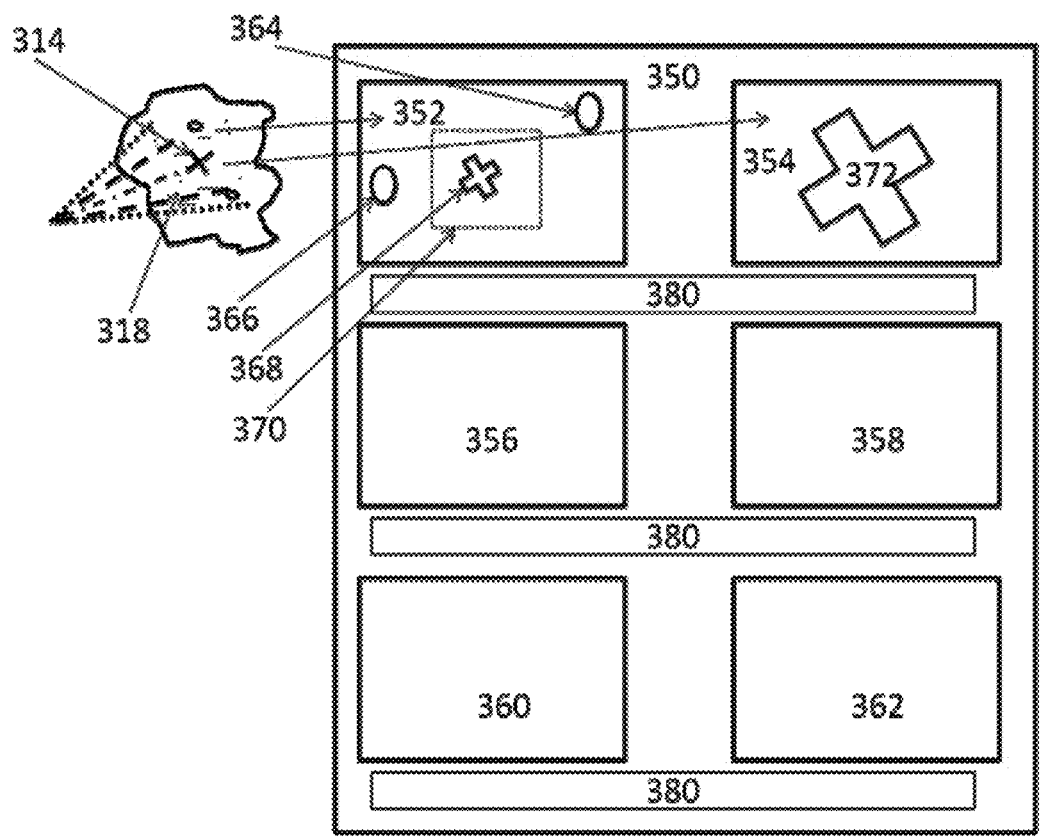
FIG. 7 is a somewhat schematic depiction of a scene and a display for reporting survey findings.

Substantial advantages for mapping out inspection pattern 760 and recording observations, data and other information in this spatially associated arrangement include: ease of reporting (see FIG. 7), a supervisor may review the accuracy and completeness of the safety inspection, a programmed logic (see FIG. 1 item L) in the handheld survey instrument may prompt an operator to look for a specific thing such as an latch condition or an operational state or a physical clearance, one may bring up some or all of the findings and observations from this and earlier surveys or safety inspections nearby to this location.

Figure 15:
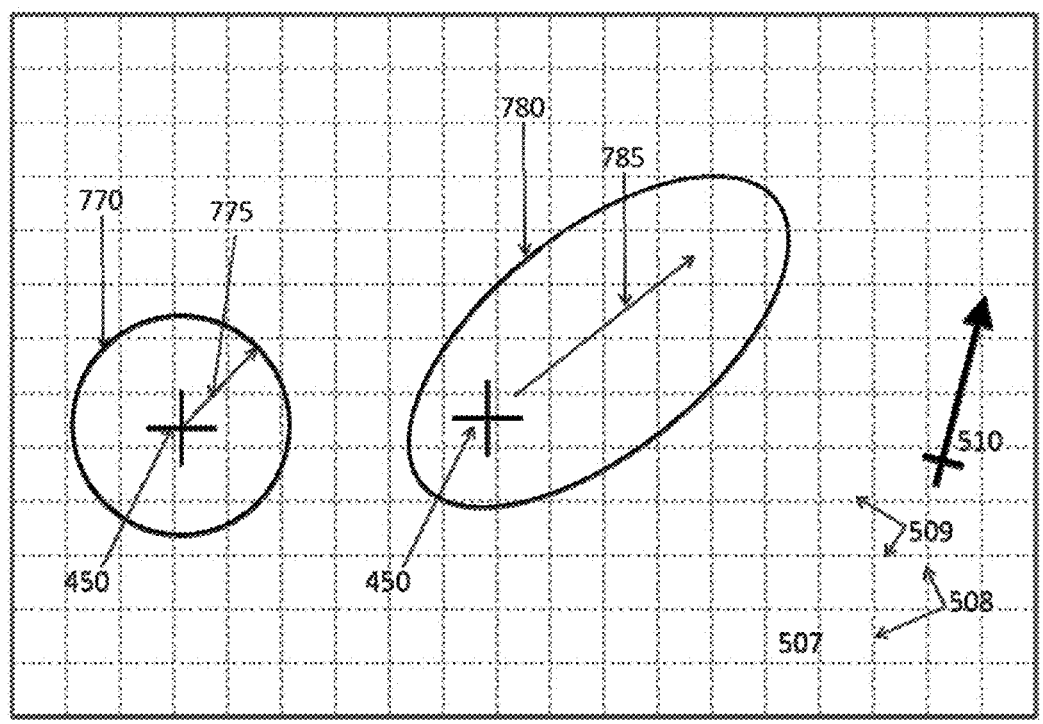
FIG. 15 is a somewhat schematic depiction of an image illustrating a safe distance boundary around a potential fault.

FIG. 15 depicts a safe boundary around a potential fault. Included with this figure is a frame of reference 507, a coordinate system 508 and 509, a reference azimuth 510, a mark 450, a circular safe boundary 770, a radius of circular boundary 775, a non-circular safe boundary 780, and one or more characteristic(s) of non-circular boundary 785. A combination of good judgment and safety regulations may be used to suggest for an instrument designer or for an in-field operator what characteristics of a boundary 770 and 775 should be for a particular type of fault.

In summary, a one embodiment of the present disclosure is a method and apparatus for assisting a surveyor to conduct a survey of a vicinity of an area comprising inspecting using a programmable survey instrument supported by programmed bases of knowledge regarding the instrument and the survey and the area, using the programmed logic operating on instrument's memory including measurements and operating on the bases of knowledge to guide the surveyor through a successful survey of the vicinity of the area. The method is useful for an experienced and for an inexperienced operator for conveyance of information useable by the operator about following a well defined process and about avoiding unproductive or misleading or incorrect steps following a well defined survey or inspection process. Examples of operating on the bases of knowledge include the following:

- operating on an electronic base of knowledge to locate objects of interest and not of interest to guide the surveyor,
- operating on an electronic base of knowledge to compile a checklist to guide the surveyor,
- operating on an electronic base of knowledge to prepare a map to guide the surveyor, operating on an electronic base of knowledge to specify instrument settings to guide the surveyor, and
- operating on an electronic base of knowledge to prepare step-by-step instructions to guide the surveyor.

Another embodiment of the present disclosure is a method and apparatus for graphically displaying operator position tracking information and graphically displaying object of interest locate information on a graphical display for a handheld survey instrument. The operator position tracking information is normally accomplished using one or more of the position tracking systems described below. The locate information action is normally accomplished using surveying transducers which are typically remote, non-contact, non-intrusive and non-destructive sensing detectors used to detect, locate, characterize, dimension, or otherwise measure an aspect of an object of interest. By graphically displaying said information, the operator may select one way of many different ways available to accomplish route or survey or more general inspection while still accomplishing a complete and well-defined sequential or parallel process. The graphically displaying method improves or maximizes levels or amounts of information available to assist an operator to make relevant decisions during and about this process. The method makes use of location and direction information to guide an operator. The display typically presents a general 2D or 2D aerial view plus depth or other 3D perspective representation of a vicinity of an area. One aspect of the perspective representation is an ability to expand around a region of interest such as a cursor on the display or a measurement location.

A base of knowledge associated with the region of interest makes stores relevant information useful for prompting an operator. Such relevant information may include facts about previous exposure to this region of interest, dangers or other warnings linked to this location or its vicinity, and limit information regarding data that is out of bounds. Frame of reference for location and direction is typically associated with a positioning system based on geometric alignment technique such as triangulation.

Another embodiment of the present disclosure is a method and apparatus for using fixed lens optics in a programmable surveying instrument to perform coaxial zoom wherein the fixed lens optics produces a distorted image representation, the programmable survey instrument mathematically transforms the distorted image information and a result is the automatic creation of first and second simultaneous images, wherein the first image is a relatively enlarged view of a central portion and the second image is a relatively wider angle view in a generally coaxial perspective. Further applications of this embodiment involve image stitching and data accumulation wherein image stitching involves connecting images or portions of adjacent or overlapping images such that the combination covers expanded spatial area and wherein data accumulation involves building up tightly spaced data in the vicinity of a center pixel Another embodiment of the present disclosure is an efficient and effective method for conducting inspections or surveys assembling measurement data and associated information to both prompt an operator to make a decision and to automatically producing concise, meaningful, and useable survey reports by a. using a programmable survey instrument with programmed bases of knowledge regarding the instrument and the survey and the area, and by using programmed logic operating on the bases of knowledge and on survey instrument responses to sensor outputs and to operator inputs, b. guiding a operator using the survey instrument by instructional prompting during the survey wherein
  i. one prompt guides the operator by question and answer to avoid a possible interference or obstruction or other false indication,
  ii. another prompt alerts or confirms in a fail vs. pass mode using a programmed logic to validate a sufficient level of detail is completed to satisfy a predetermined or prequalified successful inspection or survey result,
  iii. another prompt guides the operator by instructional prompting to attempt to improve a locate or measurement performance,
  iv. another prompt suggests the operator accept a level of importance for a locate result, and
  v. another prompt guides the operator through a locate record completion.

Another embodiment of the present disclosure is a method or apparatus wherein a survey instrument uses programmed logic to analyze operator responses or stepwise actions in comparison to programmed logic knowledge base of expected responses or stepwise actions and then acts upon that analysis to promote improved operator practices or an improved locate or measurement or result or finding.

Another embodiment of the present disclosure is a method or apparatus for a programmed survey instrument to make use of a base of knowledge information such as "difficult locates" and "interferences" and "obstructions" and "warnings" described in the base of knowledge to assist a user in avoiding false negative and false positive indications.

Another embodiment of the present disclosure is a "been here before" capability wherein a coordinate system based association of spatially resolved data and other relevant information is displayed in proximities to a mark such as a cursor on a coordinate display or such as a physical location of an operator holding a survey instrument.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of conducting a particular survey of a region of interest with a programmable survey instrument comprising:
    selecting a plurality of electronic data element requirements for data collection by an operator during the particular survey;
    electronically monitoring a plurality of preliminary data element records acquired by the operator using the programmable survey instrument;
    electronically comparing the plurality of preliminary data element records with the plurality of electronic data element requirements;
    identifying at least one missing electronic data element requirement compared with the plurality of electronic data element requirements for the particular survey;
    electronically referring to an electronic base of knowledge and deriving at least one instruction for the operator regarding how to acquire the at least one missing electronic data element requirement using the programmable survey instrument;
    electronically monitoring at least one preliminary additional data element record acquired by the operator using the programmable survey instrument;
    electronically comparing the at least one preliminary additional data element record with the at least one missing electronic data element requirement; and
    electronically advising the operator when a combination of the preliminary data element records and the at least one preliminary additional data element record conforms to the electronic data element requirements.

2. The method of claim 1 wherein the base of knowledge comprises data in an electronically accessible format selected from the group consisting of:
    a. data regarding aspects of a sensory instrumented apparatus typically used during a survey,
    b. data regarding aspects of survey conditions and techniques typically used during a survey,
    c. data regarding accessible aspects of a cartography information system typically used during a survey,
    d. data regarding accessible positioning or tracking or boundary reference information used during a survey,
    e. reference data used for tracking during a survey; and
    f. combinations of two or more thereof.

3. The method of claim 1 wherein the step of electronically referring to an electronic base of knowledge and deriving at least one instruction comprises:
    identifying a feature of the region of interest selected from the group consisting of fit, form, function, configuration, operation, and technical specification;
    comparing the at least one missing data element with the feature; and
    deriving the at least one instruction based on the comparison of the at least one missing electronic data element requirement and the feature.

4. The method of claim 1 wherein the step of electronically referring to an electronic base of knowledge and deriving at least one instruction comprises:
    comparing an object of interest in the region of interest with the at least one missing electronic data element requirement; and
    deriving the at least one instruction based on the comparison of the at least one missing electronic data element requirement and the object of interest in the region of interest.

5. The method of claim 1 wherein the step of electronically referring to an electronic base of knowledge and deriving at least one instruction comprises:
    comparing a point of interest in the region of interest with the at least one missing electronic data element requirement; and
    deriving the at least one instruction based on the comparison of the at least one missing electronic data element requirement and the point of interest in the region of interest.

6. The method of claim 1 wherein the step of electronically referring to an electronic base of knowledge and deriving at least one instruction comprises:
    comparing a boundary information characteristic of the region of interest with the at least one missing electronic data element requirement; and
    deriving the at least one instruction based on the comparison of the at least one missing electronic data element requirement and the boundary information characteristic of the region of interest.

7. A method for conducting a survey to locate a point of interest or to locate an object of interest using a programmed survey instrument having programmed logic, the method comprising:
    a. using at least one sensory transducer to produce at least one sensory signal response;
    b. using the programmed logic to access at least one base of knowledge and to access the at least one sensory signal response, and to access relational information;
    c. processing the at least one sensory signal response to produce sensory characteristic information derived from at least a portion of the at least one sensory signal response;
    d. using the programmed logic to operate on the sensory characteristic information and to operate on at least one programmed base of knowledge to recommend to an operator at least one suggested finding;
    e. using the programmed logic to operate on the relational information to tag a record of a finding with associated relational information; and
    f. using the programmed logic to graphically display a geometric or cartographic representation of the proximity showing the at least one suggested finding to assist the operator in locating the point of interest or the item of interest.

* * * * *